(12) United States Patent
Namgoong et al.

(10) Patent No.: US 10,136,286 B2
(45) Date of Patent: Nov. 20, 2018

(54) METHOD FOR CONTROLLING EXTERNAL ELECTRONIC DEVICE AND ELECTRONIC DEVICE FOR PROCESSING SAME

(71) Applicant: Samsung Electronics Co., Ltd., Gyeonggi-do (KR)

(72) Inventors: Bo-Ram Namgoong, Seoul (KR); Jeongho Ahn, Gyeonggi-do (KR); Chulkwi Kim, Gyeonggi-do (KR); Jin Sagong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 32 days.

(21) Appl. No.: 15/200,332

(22) Filed: Jul. 1, 2016

(65) Prior Publication Data

US 2017/0006149 A1 Jan. 5, 2017

(30) Foreign Application Priority Data

Jul. 1, 2015 (KR) .......................... 10-2015-0094182

(51) Int. Cl.

| | |
|---|---|
| *H04M 1/725* | (2006.01) |
| *H04M 1/66* | (2006.01) |
| *G08C 17/02* | (2006.01) |
| *H04W 4/00* | (2018.01) |
| *G06F 1/24* | (2006.01) |
| *H04M 1/68* | (2006.01) |
| *H04W 4/80* | (2018.01) |

(52) U.S. Cl.
CPC .............. *H04W 4/80* (2018.02); *G08C 17/02* (2013.01); *H04M 1/7253* (2013.01); *H04M 1/72577* (2013.01); *H04M 1/72572* (2013.01)

(58) Field of Classification Search
CPC .......... H04M 1/725; H04M 1/66; H04M 1/68; G08C 17/02; H04W 4/00; H04N 5/228; G06F 1/24; G06F 9/00; A61B 5/04; A61B 5/024
USPC .... 340/12.5; 455/411, 456, 404.1, 410, 466; 379/421; 713/100, 300, 310, 320
See application file for complete search history.

(56) References Cited

U.S. PATENT DOCUMENTS

| | | | |
|---|---|---|---|
| 7,024,176 B2 * | 4/2006 | Shimizu ............ | H04M 1/72577 379/421 |
| 7,039,425 B1 * | 5/2006 | Mazawa ............... | H04W 48/04 455/456.4 |

(Continued)

FOREIGN PATENT DOCUMENTS

KR 10-2015-0001433 1/2015

*Primary Examiner* — Nam C Nguyen

(74) *Attorney, Agent, or Firm* — The Farrell Law Firm, P.C.

(57) ABSTRACT

An electronic device and a method for controlling an external electronic device connected to the electronic device through wireless communication are provided herein. A first electronic device includes a communication module configured to communicate with a second electronic device; and a processor configured to, in response to an entry event of a communication restriction mode in which at least one communication function of the first electronic device is deactivated, provide entry information of the communication restriction mode and release information of the communication restriction mode to the second electronic device, and control performance of the communication restriction mode using the entry information and the release information.

17 Claims, 18 Drawing Sheets

(56) References Cited

U.S. PATENT DOCUMENTS

| | | | | |
|---|---|---|---|---|
| 7,260,390 B1* | 8/2007 | Skinner | G06F 1/1626 | 379/201.01 |
| 7,400,891 B2* | 7/2008 | Aaron | H04M 1/72572 | 455/410 |
| 7,903,147 B2* | 3/2011 | Lee | G08B 13/2454 | 348/222.1 |
| 8,014,721 B2* | 9/2011 | Johnson | H04M 1/7253 | 455/41.1 |
| 8,457,692 B2* | 6/2013 | Fyke | H04K 3/415 | 340/5.64 |
| 8,606,253 B2* | 12/2013 | Ahn | H04M 1/72577 | 455/1 |
| 8,761,665 B2* | 6/2014 | Lee | H04M 1/7253 | 455/41.1 |
| 9,026,780 B2* | 5/2015 | Ewell, Jr. | H04W 4/027 | 455/410 |
| 9,100,794 B2* | 8/2015 | Ewell, Jr. | H04M 1/66 | |
| 9,280,280 B2* | 3/2016 | Dearman | H04M 1/72544 | |
| 2002/0082002 A1* | 6/2002 | Fujii | G06Q 20/045 | 455/419 |
| 2005/0093980 A1* | 5/2005 | Nonaka | H04N 1/00127 | 348/207.99 |
| 2005/0239479 A1* | 10/2005 | Bednasz | H04M 1/72572 | 455/456.1 |
| 2008/0020803 A1* | 1/2008 | Rios | H04M 1/667 | 455/565 |
| 2008/0027337 A1* | 1/2008 | Dugan | A61B 5/0002 | 600/508 |
| 2009/0215466 A1* | 8/2009 | Ahl | H04M 1/66 | 455/456.1 |
| 2012/0290939 A1* | 11/2012 | Yu | G06F 21/36 | 715/741 |
| 2016/0050309 A1* | 2/2016 | Gooberman | H04M 1/72577 | 455/418 |
| 2016/0232336 A1* | 8/2016 | Pitschel | G06F 21/305 | |

* cited by examiner

METHOD FOR CONTROLLING EXTERNAL ELECTRONIC DEVICE AND ELECTRONIC DEVICE FOR PROCESSING SAME

PRIORITY

This application claims priority under 35 U.S.C. § 119(a) to Korean Application Serial No. 10-2015-0094182, which was filed in the Korean Intellectual Property Office on Jul. 1, 2015, the entire content of which is incorporated herein by reference.

BACKGROUND

1. Field of the Disclosure

The present disclosure relates generally to an electronic device and, more particularly, to an electronic device and a method for controlling an external electronic device connected to the electronic device through wireless communication.

2. Description of the Related Art

An electronic device may be connected with an external electronic device using wired/wireless communication and control the connected external electronic device. For example, the electronic device may display content of a received message through the external electronic device. As another example, the electronic device may reproduce data stored in the external electronic device.

The electronic device may also operate in a communication restriction mode (for example, an airplane mode) during which a communication function deactivated. For example, the electronic device may deactivate all communication functions, such as a cellular communication function and a short-range communication function (e.g., Bluetooth, Wi-Fi, ZigBee, and Z-Wave), supported by the electronic device, while operating in the communication restriction mode. As another example, the electronic device may activate some of the communication functions while operating in the communication restriction mode. For example, the electronic device may deactivate the cellular communication function but still activate the short-range communication function, while operating in the communication restriction mode.

In general, when an electronic device and an external electronic device are connected to each other, the external electronic device does not enter to the communication restriction mode, even when the electronic device has entered the communication restriction mode.

In addition, when an electronic device and an external electronic device to which the electronic device is connected have entered the communication restriction mode, the external electronic device does not release the communication restriction mode, even if the electronic device releases the communication restriction mode.

SUMMARY

The present disclosure has been made to address at least some the above-identified problems and provide at least the advantages described below.

An aspect of the present disclosure is to provide a method and electronic device for changing a configuration of a connected external electronic device according to a change of a configuration of the electronic device.

In accordance with an aspect of the present disclosure, a first electronic device is provided, which includes a communication module configured to communicate with a second electronic device; and a processor configured to, in response to an entry event of a communication restriction mode in which at least one communication function of the first electronic device is deactivated, provide entry information of the communication restriction mode and release information of the communication restriction mode to the second electronic device, and control performance of the communication restriction mode using the entry information and the release information.

In accordance with another aspect of the present disclosure, a second electronic device is provided, which includes a communication module configured to communicate with a first electronic device; and a processor configured to receive, from the first electronic device that enters to a communication restriction mode in which at least one communication function is deactivated, entry information of the communication restriction mode and release information of the communication restriction mode, and control a communication restriction mode of the second electronic device based on the received entry information and the received release information.

In accordance with another aspect of the present disclosure, a method is provided for operating a first electronic device, which includes identifying an entry event of a communication restriction mode in which at least one communication function of the first electronic device is deactivated; providing entry information of the communication restriction mode and release information of the communication restriction mode to a second electronic device, in response to the identified entry event; and controlling the communication restriction mode using the entry information and the release information.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION OF EMBODIMENTS OF THE DISCLOSURE

Figure 1:
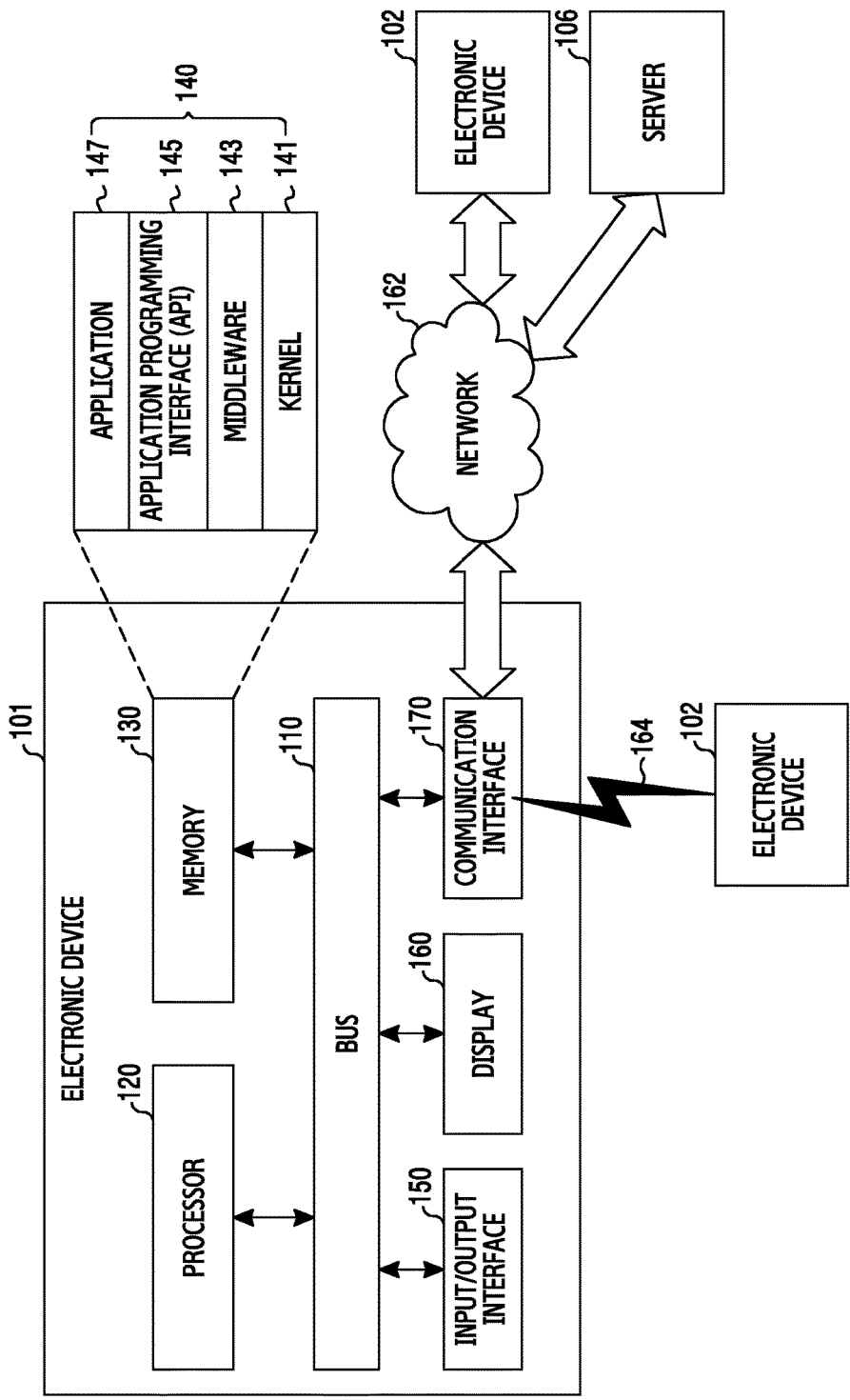
FIG. 1 illustrates a network environment including an electronic device according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the same meanings as the contextual meanings in the relevant field of art, and are not to be interpreted to have ideal or excessively formal meanings unless clearly defined in the present disclosure. In some cases, even a term defined in the present disclosure should not be interpreted to exclude embodiments of the present disclosure.

For example, the expressions "have", "may have", "include", and "may include" refer to the existence of a corresponding feature (e.g., numeral, function, operation, or constituent element such as component), and do not exclude one or more additional features.

The expressions "A or B", "at least one of A or/and B", and "one or more of A or/and B" may include all possible combinations of the items listed. For example, the expressions "A or B", "at least one of A and B", and "at least one of A or B" refer to (1) including at least one A, (2) including at least one B, or (3) including both at least one A and at least one B.

Expressions such as "a first", "a second", "the first", and "the second" may modify various components regardless of the order and/or the importance but do not limit the corresponding components. For example, a first user device and a second user device indicate different user devices although both of them are user devices. For example, a first element may be referred to as a second element, and similarly, a second element may be referred to as a first element without departing from the scope of the present disclosure.

When an element (e.g., first element) is referred to as being (operatively or communicatively) "connected," or "coupled," to another element (e.g., second element), it may be directly connected or coupled directly to the other element or any other element (e.g., third element) may be interposer between them. However, when an element (e.g., first element) is referred to as being "directly connected," or "directly coupled" to another element (second element), there are no element (e.g., third element) interposed between them.

The expression "configured to" may be used interchangeably with, for example, "suitable for", "having the capacity to", "designed to", "adapted to", "made to", or "capable of" according to context. The term "configured to" may not necessarily imply "specifically designed to" in hardware. Alternatively, in some situations, the expression "device configured to" may mean that the device, together with other devices or components, "is able to".

For example, the phrase "a processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module' may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

The definition of the terms "unit" or "module" as referred to herein are to be understood as constituting hardware circuitry such as a CCD, CMOS, SoC, ASIC, FPGA, at least one processor or microprocessor (e.g. a controller or control unit) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. § 101 and do not constitute software per se.

The computer readable recoding medium may include a hard disk, a floppy disk, magnetic media (for example, a magnetic tape), optical media (for example, a Compact Disc Read Only Memory (CD-ROM) and a Digital Versatile Disc (DVD)), magneto-optical media (for example, a floptical disk), a hardware device (for example, a Read Only Memory (ROM), a Random Access Memory (RAM), a flash memory), etc. In addition, the program instructions may include high class language codes, which can be executed in a computer by using an interpreter, as well as machine codes made by a compiler. Any of the hardware devices as described herein may be configured to work as one or more software modules in order to perform the operations according to various embodiments of the present disclosure, and vice versa.

An electronic device according to an embodiment of the present disclosure may include a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. For example, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance, such as a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® and PlayStation®), an electronic dictionary, an electronic key, a camcorder, and an electronic photo frame.

The electronic device may also include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) device in a shop, or Internet of Things (IoT) device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter).

The electronic device may also be a flexible device.

The electronic device may also be a combination of one or more of the aforementioned various devices.

Further, the electronic device is not limited to the aforementioned devices, and may include a new electronic device according to the development of new technology.

Herein, the term "user" may indicate a person who uses an electronic device or a device (e.g., an artificial intelligence electronic device) that uses an electronic device.

FIG. 1 illustrates a network environment including an electronic device according to an embodiment of the present disclosure.

Referring to FIG. 1, the electronic device 101 includes a bus 110, a processor 120, a memory 130, an input/output interface 150, a display 160, and a communication interface 170. Alternatively, the electronic device 101 may omit at least one of the above elements or may further include other elements.

The bus 110 may include, for example, a circuit for connecting the elements 110-170 and transferring communication (e.g., control messages and/or data) between the elements.

The processor 120 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. For example, the processor 120 may include one or more of a Central Processing Unit (CPU), an Application Processor (AP), and a Communication Processor (CP). The processor 120, for example, may carry out operations or data processing relating to control and/or communication of at least one other element of the electronic device 101.

The memory 130 may include any suitable type of volatile or non-volatile memory, such as Random-access Memory (RAM), Read-Only Memory (ROM), Network Accessible Storage (NAS), cloud storage, a Solid State Drive (SSD), etc. The memory 130 may include a volatile memory and/or a non-volatile memory. The memory 130 may store instructions or data relevant to at least one other element of the electronic device 101. According to an embodiment, the memory 130 may store software and/or a program 140. The program 140 includes a kernel 141, middleware 143, an Application Programming Interface (API) 145, and application programs (or "applications") 147. At least some of the kernel 141, the middleware 143, and the API 145 may be referred to as an Operating System (OS).

The kernel 141 may control or manage system resources (e.g., the bus 110, the processor 120, or the memory 130) used for performing an operation or function implemented by the other programs (e.g., the middleware 143, the API 145, or the application programs 147). Further, the kernel 141 may provide an interface through which the middleware 143, the API 145, or the application programs 147 may access the individual elements of the electronic device 101 to control or manage the system resources.

The middleware 143 may function as an intermediary for allowing the API 145 or the application programs 147 to communicate with the kernel 141 to exchange data.

In addition, the middleware 143 may process one or more operation requests received from the application program 147 according to priority. For example, the middleware 143 may give priority to use the system resources of the electronic device 101 (for example, the bus 110, the processor 120, the memory 130, etc.) to at least one of the application programs 147. For example, the middleware 143 may perform scheduling or load balancing with respect to the one or more operation requests by processing the one or more operation requests according to the priority given to the at least one application program.

The API 145 is an interface through which the applications 147 control functions provided from the kernel 141 or the middleware 143, and may include at least one interface or function (e.g., instruction) for file control, window control, image processing, or text control.

The input/output interface 150 may function as an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include a Liquid Crystal Display (LCD), a Light Emitting Diode (LED) display, an Organic Light Emitting Diode (OLED) display, a Micro Electro Mechanical System (MEMS) display, or an electronic paper display. The display 160 may display various types of content (e.g., text, images, videos, icons, or symbols) for the user. The display 160 may include a touch screen and receive a touch, gesture, proximity, or hovering input using an electronic pen or the user's body part.

The communication interface 170 may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM), as a cellular communication protocol. In addition, the wireless communication includes short range communication 164. The short-range communication 164 may be performed by using at least one of, for example, Wi-Fi, Bluetooth, Bluetooth low energy (BLE), Near Field Communication (NFC), and Global Navigation Satellite System (GNSS). The GNSS may include at least one of a Global Positioning System (GPS), a Global Navigation Satellite System (Glonass), a Beidou Navigation Satellite System (Beidou), and a European Global Satellite-based Navigation System (Galileo), according to a use area, a bandwidth, or the like. Hereinafter, "GPS" may be interchangeably used with "GNSS".

The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of a communication network such as a computer network (e.g., a LAN or a WAN), the Internet, and a telephone network.

Each of the first and second external electronic apparatuses 102 and 104 may be of a type identical to or different from that of the electronic apparatus 101.

The server 106 may include a group of one or more servers.

All or some of the operations performed in the electronic device 101 may be performed in another electronic device or a plurality of electronic devices (e.g., the electronic devices 102 and 104 or the server 106). For example, when the electronic device 101 has to perform some functions or services automatically or in response to a request, the electronic device 101 may make a request for performing at least some functions relating thereto to another device (e.g., the electronic device 102 or 104 or the server 106) instead of performing the functions or services by itself or in addition. Another electronic apparatus may execute the requested functions or the additional functions, and may deliver a result of the execution to the electronic apparatus 101. The electronic device 101 may process the received result as it is or additionally to provide the requested functions or services. To achieve this, for example, cloud computing, distributed computing, or client-server computing technology may be used.

Figure 2:
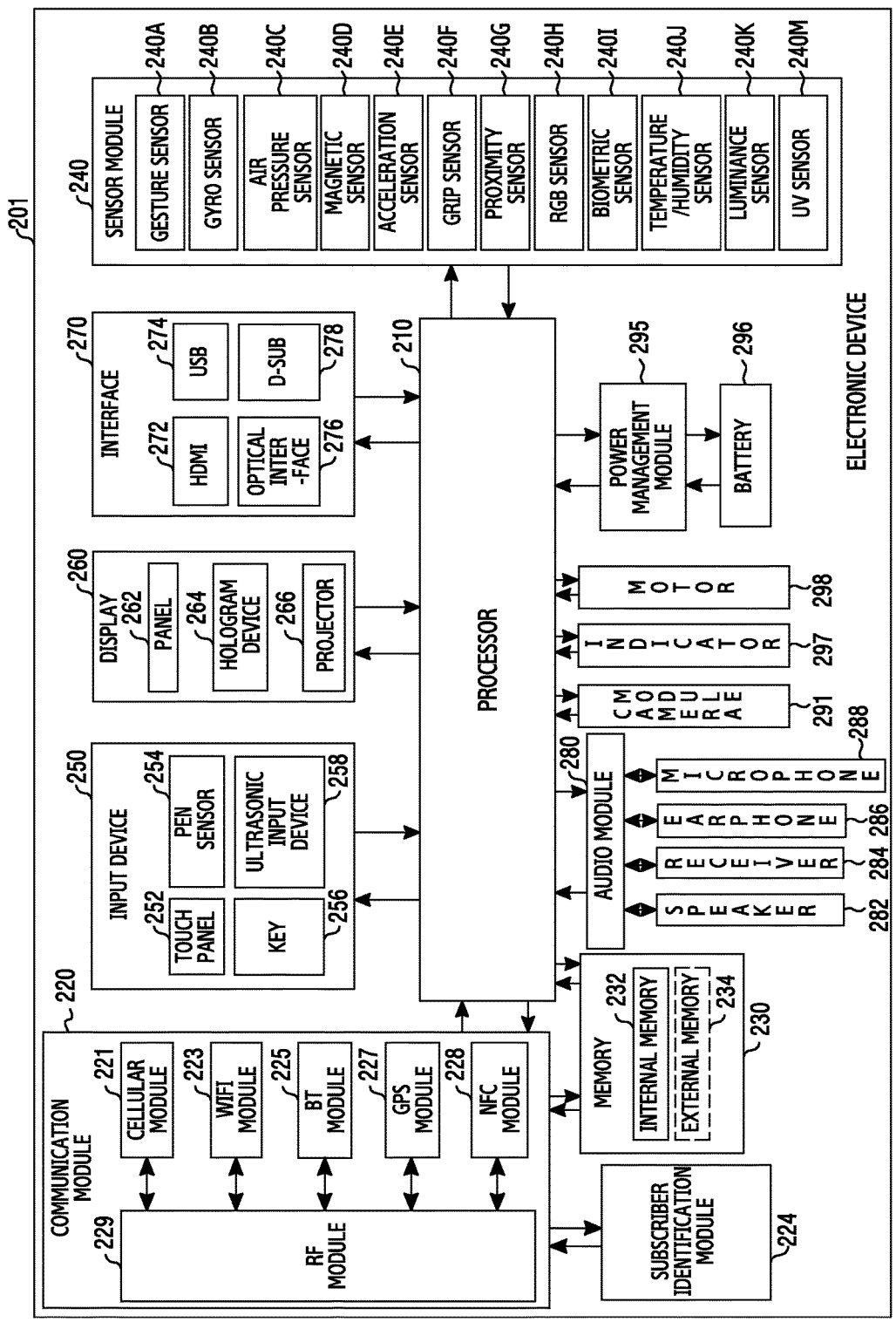
FIG. 2 illustrates an electronic device according to an embodiment of the present disclosure.

FIG. 2 illustrates an electronic device according to an embodiment of the present disclosure.

Referring to FIG. 2, the electronic device 201 includes a processor (e.g., Application Processor (AP)) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by a System on Chip (SoC). The processor 210 may further include a Graphic Processing Unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 includes the cellular module 221, a Wi-Fi module 223, a Bluetooth (BT) module 225, a Bluetooth low energy module 226, a GNSS module 227 (e.g., a GPS module, a Glonass module, a Beidou module, or a Galileo module), an NFC module 228, and a Radio Frequency (RF) module 229.

The cellular module 221 may provide a voice call, image call, a text message service, or an Internet service through, for example, a communication network. The cellular module 221 may distinguish between and authenticate electronic devices 201 within a communication network using a subscriber identification module 224. The cellular module 221 may perform at least some of the functions that the processor 210 may provide. The cellular module 221 may include a Communication Processor (CP).

Each of the Wi-Fi module 223, the BT module 225, the Bluetooth low energy module 226, the GNSS module 227, and the NFC module 228 may include a processor for processing data transmitted and received through the relevant module.

At least some (e.g., two or more) of the cellular module 221, the Wi-Fi module 223, the BT module 225, the GNSS module 227, and the NFC module 228 may be included in one Integrated Chip (IC) or IC package.

The RF module 229 may transmit/receive, for example, a communication signal (for example, an RF signal). The RF module 229 may include a transceiver, a Power Amplifier Module (PAM), a frequency filter, a Low Noise Amplifier (LNA), and an antenna.

At least one of the cellular module 221, the Wi-Fi module 223, the BT module 225, the Bluetooth low energy module 226, the GNSS module 227, and the NFC module 228 may transmit and receive RF signals through a separate RF module.

The SIM 224 may include a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 includes an internal memory 232 and an external memory 234. The embedded memory 232 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), etc.).

The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, etc. The external memory 234 may be functionally and/or physically connected to the electronic apparatus 201 through various interfaces.

The sensor module 240 may measure a physical quantity or detect an operation state of the electronic device 201, and may convert the measured or detected information into an electrical signal. The sensor module 240 includes a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a Red/Green/Blue (RGB) sensor), a bio-sensor 240I, a temperature/humidity sensor 240J, a light sensor 240K, and an Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris sensor, and a fingerprint sensor. The sensor module 240 may further include a control circuit for controlling one or more sensors included therein. In some embodiments of the present disclosure, the electronic apparatus 201 may further include a processor configured to control the sensor module 240 as a part of or separately from the processor 210, and may control the sensor module 240 while the processor 210 is in a sleep state.

The input device 250 includes a touch panel 252, a (digital) pen sensor 254, a key 256, and an ultrasonic input device 258. The touch panel 252 may use at least one of a capacitive type, a resistive type, an infrared type, and an ultrasonic type. Also, the touch panel 252 may further include a control circuit. The touch panel 252 may further include a tactile layer and provide a tactile reaction to the user.

The (digital) pen sensor 254 may include a recognition sheet which is a part of the touch panel or is separated from the touch panel.

The key 256 may include a physical button, an optical key or a keypad.

The ultrasonic input device 258 may detect ultrasonic wavers generated by an input tool through a microphone 288 and identify data corresponding to the detected ultrasonic waves.

The display 260 includes a panel 262, a hologram device 264 and a projector 266.

The panel 262 may be implemented to be flexible, transparent, and/or wearable. The panel 262 and the touch panel 252 may be implemented as one module.

The hologram 264 may show a three dimensional image in the air by using an interference of light.

The projector 266 may display an image by projecting light onto a screen. The screen may be located, for example, inside or outside the electronic apparatus 201.

The display 260 may further include a control circuit for controlling the panel 262, the hologram device 264, and/or the projector 266.

The interface 270 includes a High-Definition Multimedia Interface (HDMI) 272, a Universal Serial Bus (USB) 274, an optical interface 276, and a D-subminiature (D-sub) 278.

Additionally or alternatively, the interface 270 may include a Mobile High-definition Link (MHL) interface, a Secure Digital (SD) card/Multi-Media Card (MMC) interface, or an Infrared Data Association (IrDA) standard interface.

The audio module 280 may bilaterally convert a sound and an electrical signal. The audio module 280 may process sound information which is input or output through a speaker 282, a receiver 284, earphones 286, the microphone 288, etc.

The camera module 291 may photograph a still image and a dynamic image. The camera module 291 may include one or more image sensors (for example, a front sensor or a back sensor), a lens, an Image Signal Processor (ISP) or a flash (for example, LED or xenon lamp).

The power management module 295 may manage, for example, power of the electronic device 201. The power management module 295 may include a Power Management Integrated Circuit (PMIC), a charger Integrated Circuit (IC), or a battery gauge. The PMIC may use a wired and/or wireless charging method. Examples of the wireless charging method may include, for example, a magnetic resonance method, a magnetic induction method, an electromagnetic method, etc. Additional circuits (e.g., a coil loop, a resonance circuit, a rectifier, etc.) for wireless charging may be further included. The battery gauge may measure, for example, a residual quantity of the battery 296, and a voltage, a current, or a temperature during the charging. The battery 296 may include a rechargeable battery or a solar battery.

The indicator 297 may display a particular state (e.g., a booting state, a message state, a charging state, etc.) of the electronic apparatus 201 or a part (e.g., the processor 210).

The motor 298 may convert an electrical signal into mechanical vibration, and may generate vibration, a haptic effect, etc.

Although not illustrated, the electronic apparatus 201 may also include a processing unit (e.g., a GPU) for supporting a mobile television (TV). The processing unit for supporting mobile TV may process media data according to a certain standard such as Digital Multimedia Broadcasting (DMB), Digital Video Broadcasting (DVB), or mediaFLO®.

Each of the above-described component elements of hardware according to the present disclosure may be configured with one or more components, and the names of the corresponding component elements may vary based on the type of electronic device.

The electronic device according to an embodiment of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
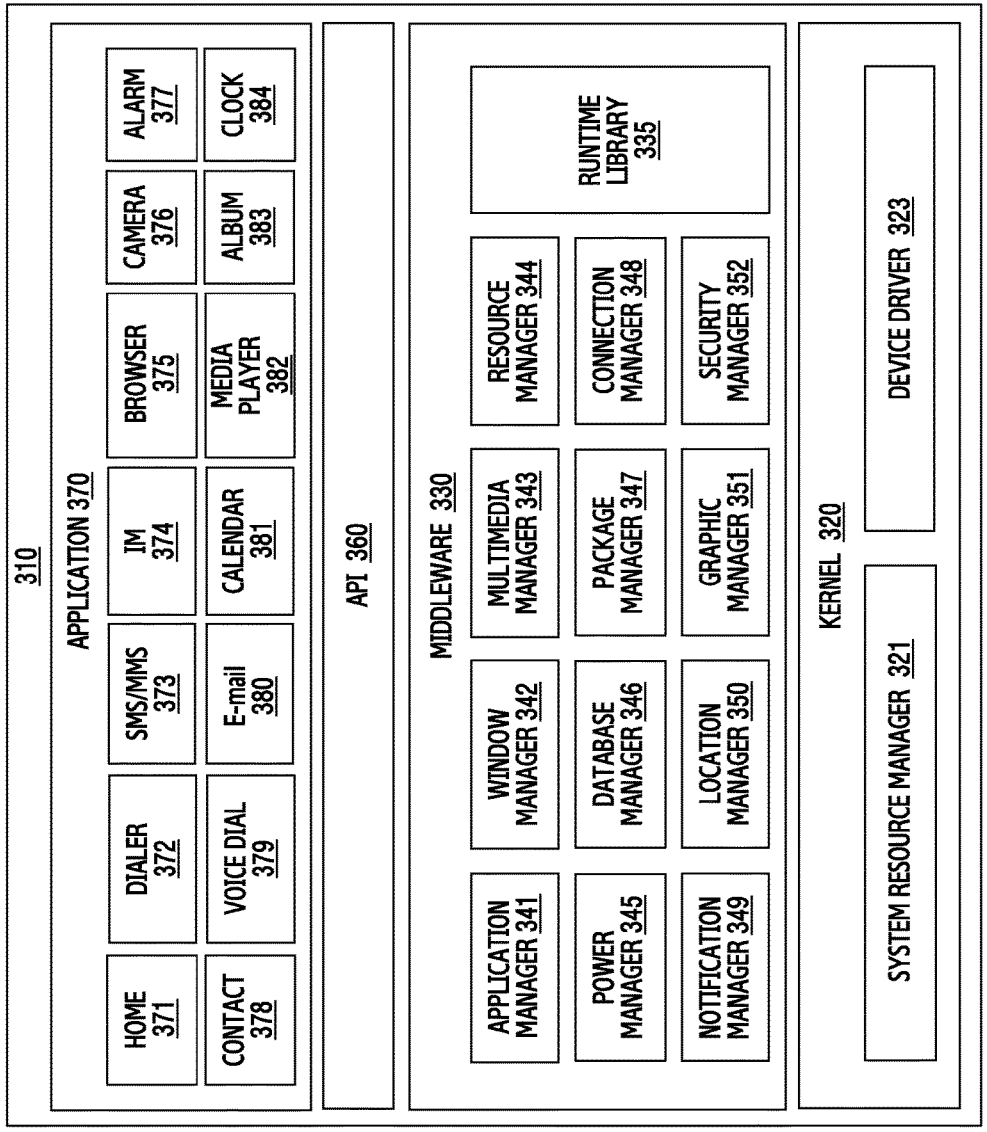
FIG. 3 illustrates a program module according to an embodiment of the present disclosure.

FIG. 3 illustrates a program module according to an embodiment of the present disclosure.

Referring to FIG. 3, the program module 310 (may include an Operating System (OS) for controlling resources related to the electronic device (for example, the electronic device 101) and/or various applications executed in the operating system. The operating system may be, for example, Android®, iOS®, Windows®, Symbian, Tizen, Bada, etc.

The program module 310 includes a kernel 320, middleware 330, an API 360, and/or an application 370. At least some of the program module 310 may be preloaded on the electronic apparatus, or may be downloaded from an external electronic apparatus.

The kernel 320 (includes a system resource manager 321 and a device driver 323. The system resource manager 321 may perform the control, allocation, retrieval, etc., of system resources. The system resource manager 321 may include a process manager, a memory manager, a file system manager, or the like. The device driver 323 may include a display driver, a camera driver, a Bluetooth driver, a shared memory driver, a USB driver, a keypad driver, a Wi-Fi driver, an audio driver, or an Inter-Process Communication (IPC) driver.

The middleware 330 may provide a function required by the applications 370 in common or provide various functions to the applications 370 through the API 360 so that the applications 370 can efficiently use limited system resources within the electronic device. The middleware 330 includes a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, the functionality for an arithmetic function, etc.

The application manager 341 may manage the life cycle of at least one of the applications 370.

The window manager 342 may manage Graphical User Interface (GUI) resources used for the screen.

The multimedia manager 343 may determine a format required to reproduce various media files, and may encode or decode a media file by using a coder/decoder (codec) appropriate for the relevant format.

The resource manager 344 may manage resources, such as a source code, a memory, a storage space, and the like of at least one of the applications 370.

The power manager 345 may operate together with a Basic Input/Output System (BIOS) to manage a battery or power and may provide power information required for the operation of the electronic device.

The database manager 346 may generate, search for, and/or change a database to be used by at least one of the applications 370.

The package manager 347 may manage the installation or update of an application distributed in the form of a package file.

The connectivity manager 348 may manage a wireless connection such as, for example, Wi-Fi or Bluetooth.

The notification manager 349 may display or notify of an event, such as an arrival message, an appointment, a proximity notification, etc.

The location manager 350 may manage location information of the electronic apparatus.

The graphic manager 351 may manage a graphic effect, which is to be provided to the user, or a user interface related to the graphic effect.

The security manager 352 may provide various security functions for system security, user authentication, etc.

When the electronic apparatus has a telephone call function, the middleware 330 may further include a telephony manager for managing a voice call function or a video call function of the electronic apparatus.

The middleware 330 may include a middleware module that forms a combination of various functions of the above-described elements. The middleware 330 may provide a module specialized for each type of OS in order to provide a differentiated function. Also, the middleware 330 may dynamically delete some of the existing elements, or may add new elements.

The API 360 is, for example, a set of API programming functions, and may be provided with a different configuration according to an OS. For example, in the case of Android® or iOS®, one API set may be provided for each platform. In the case of Tizen, two or more API sets may be provided for each platform.

The applications 370 include a home application 371, a dialer application 372, an SMS/MMS application 373, an Instant Message (IM) application 374, a browser application 375, a camera application 376, an alarm application 377, a contacts application 378, a voice dialer application 379, an email application 380, a calendar application 381, a media player application 382, an album application 383, a clock application 384, a health care application (for example, measure exercise quantity or blood sugar), or environment information application (for example, atmospheric pressure, humidity, or temperature information).

The applications 370 may include an information exchange application supporting information exchange between the electronic apparatus and an external electronic apparatus. The information exchange application may include a notification relay application for forwarding specific information to an external electronic device, or a device management application for managing an external electronic device.

For example, the notification relay application may include a function of delivering, to the external electronic apparatus, notification information generated by other applications (e.g., an SMS/MMS application, an email application, a health care application, an environmental information application, etc.) of the electronic apparatus. Further, the notification relay application may receive notification information from, for example, an external electronic device and provide the received notification information to a user.

The device management application may manage (for example, install, delete, or update), a function for at least a part of the external electronic device communicating with the electronic device (for example, turning on/off the external electronic device itself (or some elements thereof) or adjusting brightness (or resolution) of a display), applications executed in the external electronic device, or services provided from the external electronic device (for example, a telephone call service or a message service).

The applications 370 may include applications (for example, a health care application of a mobile medical appliance, etc.) designated according to attributes of the external electronic device.

The application 370 may include an application received from the external electronic apparatus.

The application 370 may include a preloaded application or a third party application which can be downloaded from the server.

Names of the elements of the program module 310, according to the above-described embodiments of the present disclosure, may change depending on the type of OS.

At least some of the program module 310 may be implemented in software, firmware, hardware, or a combination of two or more thereof. At least some of the program module 310 may be implemented (e.g., executed) by a processor. At least some of the program module 310 may include a module, a program, a routine, a set of instructions, and/or a process for performing one or more functions.

According to various embodiments, at least some of the devices (for example, modules or functions thereof) or the method (for example, operations) according to the present disclosure may be implemented by a command stored in a computer-readable storage medium in a programming module form. The instruction, when executed by a processor, may cause the one or more processors to execute the function corresponding to the instruction. The computer-readable storage medium may be, a memory.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

Figure 4:
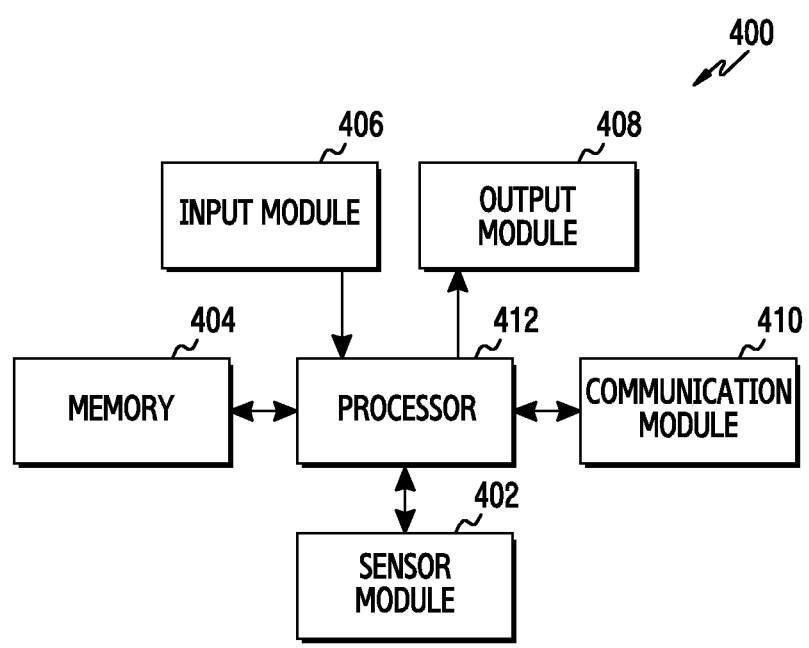
FIG. 4 illustrates an electronic device according to an embodiment of the present disclosure.

FIG. 4 illustrates an electronic device according to an embodiment of the present disclosure.

Referring to FIG. 4, an electronic device 400 (for example, at least one of a mobile device and a wearable device) includes a sensor module 402, a memory 404, an input module 406, an output module 408, a communication module 410, and a processor 412.

The sensor module 402 may convert measurement information on a physical quantity or detection information on the operation state of the electronic device into an electric signal so as to generate sensing information. For example, the sensor module 402 may include a motion sensor (for example, an accelerometer, a gyroscope, a geomagnetic sensor, an altitude sensor (barometer), a pressure sensor (pressure meter), etc.), a microphone sensor for receiving a non-audible band frequency, an image sensor, an ultrasonic sensor, Visual Light Circuit (VLC), a touch sensor, etc.

The sensor module 402 may acquire information associated with an entry into a communication restriction mode and a release of the communication restriction mode.

The information associated with an entry into the communication restriction mode and a release of the communication restriction mode may include a voice command. In this case, the sensor module 402 may detect a user's voice command, such as "enter to a communication restriction mode" or "release of a communication restriction mode". Here, the voice command may be modified, changed, or deleted according to a user's control using a predetermined function.

The information associated with an entry into the communication restriction mode and a release of the communication restriction mode may include the movement of the electronic device. In this case, the sensor module 402 may detect the movement of the electronic device 400 for entering to and releasing of the communication restriction mode. For example, the sensor module 402 may detect the rotation angle of the electronic device 400 for deciding a predefined movement.

The information associated with an entry into the communication restriction mode and a release of the communication restriction mode may include an atmospheric pressure (or a change in the atmospheric pressure). In such a case, the sensor module 402 may detect an atmospheric pressure (or a change in a predetermined pressure) greater than, less than, or equal to a predetermined threshold value, in order to perform operations of entering to the communication restriction mode and releasing of the communication restriction mode.

The information associated with an entry to the communication restriction mode and a release of the communication restriction mode may include an altitude (or a change in altitude). In such a case, the sensor module 402 may detect an altitude (or a change in altitude) greater than, less than, or equal to a predetermined threshold value, in order to perform operations of entering to the communication restriction mode and releasing the communication restriction mode.

The information associated with an entry into the communication restriction mode and a release of the communication restriction mode may include a touch input. In such a case, the sensor module 402 may detect a touch, gesture, proximity, or a hovering input using an electronic pen and a part of a user's body for selecting an entry into the communication restriction mode and a release of the communication restriction mode.

The memory 404 may store operation programs of the electronic device 400. Here, the memory 404 may store programs for executing various functions. In addition, the memory 404 may store data generated while the programs are executed.

The memory 404 may store information, used by the sensor module 402, for determining an entry into the communication restriction mode and a release of the communication restriction mode. For example, the memory 404 may store information associated with voice commands defined so as to enter to the communication restriction mode and release the communication restriction mode and a threshold value associated with an entry into the communication restriction mode and a release of the communication restriction mode.

The memory 404 may store entry information of the communication restriction mode and release information of the communication restriction mode. For example, memory 404 may store at least one of position information and time information associated with the entry into the communication restriction mode and release of the communication restriction mode. In addition, the entry information of the communication restriction mode and release information of the communication restriction mode may be specified by the user or configured based on the schedule information. Of course, the entry information of the communication restriction mode and release information of the communication restriction mode may be provided from other electronic devices and stored in the memory 404.

The input module 406 may forward the command or information for controlling the operation of the electronic device, input from a user or other external electronic devices, to the other components of the electronic device 400. For example, the input module 406 may include a keypad, a dome switch, a physical button, a touch pad (resistive type/capacitive type), a jog & shuttle, etc. Here, the input module 406 may be implemented as a touch screen while being coupled to the output unit 408.

The input module 406 may generate input information for the entry into the communication restriction mode and the release of the communication restriction mode, and transfer the input information to the other component (s) of the electronic device 400. For example, the input module 406 may transfer input information generated corresponding to the button input for the entry into the communication restriction mode and release of the communication restriction mode to the processor 412 of the electronic device 400.

The output module 408 may include an LCD, an LED display, an OLED display, a MEMS display, and an electronic paper display.

The output module 408 may output to the user information associated with entry information of the communication restriction mode and release information of the communication restriction mode. For example, the output module 408 may output an input window for inputting the entry information of the communication restriction mode and release information of the communication restriction mode in the electronic device 400. As another example, the output module 408 may output identification information for identifying whether the communication restriction mode is released in the electronic device 400.

The communication unit 410 may perform communication in the electronic device 400. At this time, the communication module 410 may communicate with an external electronic device through various communication methods. For example, the communication module 410 may communicate with the external electronic device using LTE, WCDMA, GSM, Wi-Fi, Bluetooth, and NFC.

The communication module 410 may be maintained in a state where at least some of the communication functions are deactivated by the control of the processor 412 in the communication restriction mode. Here, the communication module 410 may include a first communication module and a second communication module according to a communication scheme. In this case, in the communication module 410, the second communication module may be deactivated while the first communication module is activated under the control of the processor 412 in the communication restriction mode. For example, when entering to the communication restriction mode, the communication module 410 may activate a short-range communication function, such as Bluetooth, Wi-Fi, ZigBee, and Z-Wave, under the control of the processor 412. As another example, when entering to a communication restriction mode, the communication module 410 may deactivate all communication functions according to the control of the processor 412.

The processor 412 (for example, Central Processing Unit (CPU)) may include one or more of an Application Processor (AP) and a Communication Processor (CP).

The electronic device 400 may be a first electronic device (for example, a portable terminal) for controlling the external electronic device. In this case, the processor 412 may control the external electronic device to enter to the communication restriction mode in response to the detection of a condition for entering to the communication restriction mode and the external electronic device may enter to the communication restriction mode. For example, the electronic device 400 may determine an entry into the communication restriction mode based on the information such as a button input detected through the input module 406 or the sound, motion, pressure, altitude, and touch input detected through the sensor module 402, and provide the result of the determination to the external electronic device. The external electronic device may enter to a communication restriction mode in response to the reception of the determination result. In addition, the processor 412 may release the communication restriction mode when at least one piece of information among the information such as the button input detected through the input module 416 or the sound, motion, pressure, altitude, and touch input detected through the sensor module 402 satisfies a release condition for the communication restriction mode. The processor 412 may control the external electronic device to release the communication restriction mode when the electronic device 400 is connected to the external electronic device through the short range communication. For example, the processor 412 may provide information indicating the release of the communication restriction information, through a short range communication, to the external electronic device which operates in the communication restriction mode.

When entering to the communication restriction mode, the processor 412 may configure the release information of the communication restriction mode for releasing the communication restriction mode of the external electronic device. For example, the processor 412 may configure the release information of the communication restriction mode by using at least one of a user's input and schedule information. Here, the communication restriction mode may be a mode in which at least some of the communication functions can be maintained in a deactivated state. In this case, before entering to the communication restriction mode, the processor 412 may transmit release information of the communication restriction mode to the connected external electronic device. The release information of the communication restriction mode may include information for determining the timing of releasing the communication restriction mode. For example, the release information of the communication restriction mode may include location information or time information associated with the release timing of the communication restriction mode.

The processor 412 may determine a time point which satisfies conditions included in the release information of the communication restriction mode as the release timing of the communication restriction mode. Here, the conditions included in the release information of the communication restriction mode may be input through the sensor module 402 or the input module 406, or extracted from the schedule information transmitted from the memory 404, the external electronic device, or the server. For example, the processor 412 may receive the current location information of the electronic device 400 using the activated communication function. The processor 412 may compare the received current location information with the location information included in the release information of the communication restriction mode. The processor 412 may determine a time point of entering to the location included in the release information as the release timing of the communication restriction mode. As another example, the processor 412 may determine a time included in the release information of the communication restriction mode as the release timing of the communication restriction mode.

The electronic device 400 may be a second electronic device (for example, a wearable device) which is controlled by the external electronic device (for example, first electronic device). In this case, the processor 412 may enter to a communication restriction mode under the control of the first electronic device. For example, the processor 412 may be controlled to be operated in a communication restriction mode such that all the communication functions are maintained in a deactivated state or some of the communication functions are maintained in an activated state corresponding to the entry information of the communication restriction mode, which is provided from the first electronic device.

The processor 412 may determine the time point of receiving the entry information of the communication restriction mode as the timing of entering to the communication restriction mode, and enter to the communication restriction mode at the time point of receiving the entry information of the communication restriction mode. The processor 412 may determine the time point which satisfies conditions included in the entry information of the communication restriction mode as the timing of entering to the communication restriction mode. Here, the conditions included in the entry information of the communication restriction mode may be input through the sensor module 402 or the input module 406, or extracted from the schedule information transmitted from the memory 404, the external electronic device, or the server. For example, the processor 412 may receive the current location information of the electronic device 400 using the activated communication function.

The processor 412 may compare the received current location information with the location information included in the entry information of the communication restriction mode. The processor 412 may determine the time point of entering to the location included in the release information as the timing of entering to the communication restriction mode. As another example, the processor 412 may determine the time included in the entry information of the communication restriction mode as the timing of entering to the communication restriction mode.

The processor 412 may configure the time point of releasing the communication restriction mode in response to the reception of the release information of the communication restriction mode from the first electronic device. For example, the processor 412 may operate in the communication restriction mode during which a timer is operated after creating a timer corresponding to the time at which the first electronic device operates in the communication restriction mode.

The processor 412 may release the communication restriction mode in response to receiving a release command of the communication restriction mode through the first electronic device while operating in the communication restriction mode. In addition, the release command of the communication restriction mode may be provided from the first electronic device while the timer operates. In addition, the release command of the communication restriction mode may be provided from the first electronic device by using a short range communication which is not deactivated.

Figure 5:
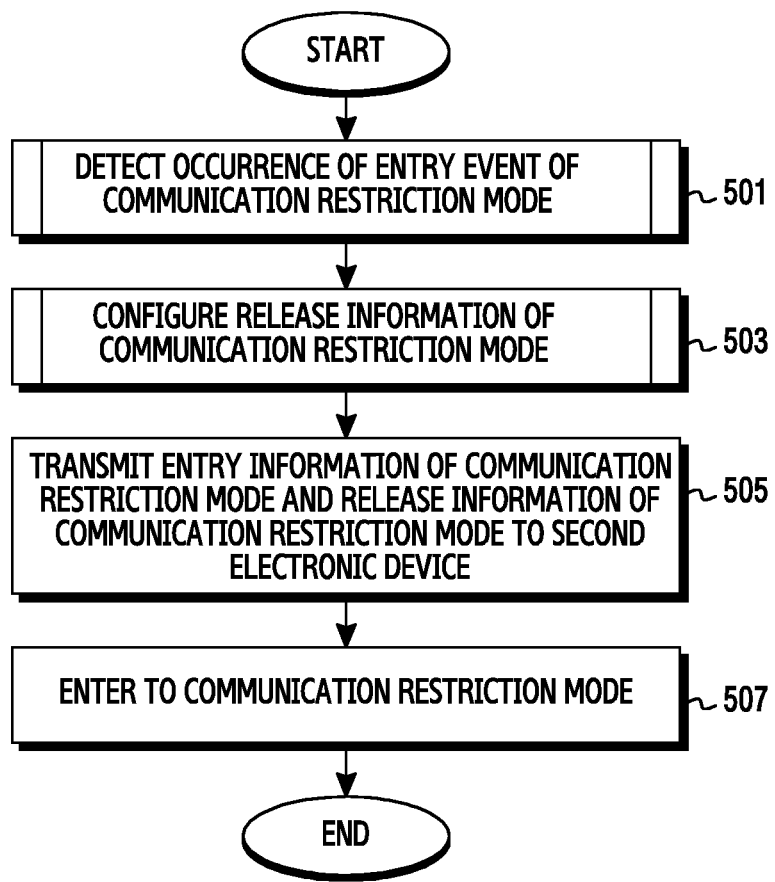
FIG. 5 is a flow diagram illustrating a method for controlling a communication restriction mode of a second electronic device by a first electronic device according to an embodiment of the present disclosure.

FIG. 5 is a flow diagram illustrating a method for controlling a communication restriction mode of a second electronic device by a first electronic device according to an embodiment of the present disclosure.

Referring to FIG. 5, in operation 501, the processor 412 detects an occurrence of an entry event of the communication restriction mode. Here, the communication restriction mode may include a mode for maintaining at least some communication functions supported by the first electronic device 400 in a deactivated state. The communication functions to be deactivated may include at least one of a cellular communication function and a short range communication function. For example, the processor 412 may detect the occurrence of an entry event of the communication restriction mode based on at least one piece of information among sensing information detected through the sensor module 402 and input information detected through the input module 406.

In operation 503, the processor 412 configures the release information of the communication restriction mode. The release information of the communication restriction mode may be associated with a time during which the communication restriction mode is operated. For example, the release information of the communication restriction mode may include at least one of a time at which the communication restriction mode is release and a time at which a remaining time until the communication restriction mode is released.

The processor 412 may configure a time at which the communication restriction mode is released, by analyzing schedule information stored in the memory 404 and schedule information provided from the external electronic device or the server, etc. For example, the processor 412 may check time information (for example, arrival time) from the schedule information provided from the memory 404, the external electronic device, or the server, and configure the checked time information as the release time of the communication restriction mode.

The processor 412 may configure release information of the communication restriction mode based on user's input information. For example, the processor 412 may configure a release time of the communication restriction mode based on any one input of a touch input detected through the sensor module 402 and a button input detected through the input module 406.

In operation 505, the processor 412 processes the second electronic device (for example, a wearable device) to enter to the communication restriction mode in response to the occurrence of an entry event of the communication restriction mode. For example, the processor 412 controls the entry information of the communication restriction mode and release information of the communication restriction mode to be transmitted to the second electronic device. For example, the processor 412 may control the entry information of the communication restriction mode and release information of the communication restriction mode to be transmitted before entering to the communication restriction mode. The second electronic device may enter to the communication restriction mode in response to receiving the entry information of the communication restriction mode. In addition, the second electronic device may configure the time during which the second electronic device operates in the communication restriction mode in response to receiving the release information of the communication restriction mode.

In operation 507, the processor 412 controls the second electronic device to enter to the communication restriction mode in response to transmitting, to the second electronic device, the entry information of the communication restriction mode and release information of the communication restriction mode. For example, the processor 412 may control all the communication functions of the communication module 410 to be maintained in a deactivated state in response to transmitting, to the second electronic device, the entry information of the communication restriction mode and release information of the communication restriction mode. When the first electronic device 400 supports a cellular communication function and a short range communication function, the processor 412 may not perform the cellular communication function and short range communication function while the first electronic device operates in the communication restriction mode.

The first electronic device 400 may release the communication restriction mode in response to detecting a release event of the communication restriction mode while operating in the communication restriction mode in which some of the communication functions are maintained in an activated state. The release event of the communication restriction mode may be detected based on at least one piece of information among the sensing information detected through the sensor module 402 and the input information detected through the input module 406. For example, while operating in the communication restriction mode, the first electronic device may determine that the release event has occurred in response to detecting an input (for example, sound, a motion, pressure, an altitude, a touch input, a button input, etc.) corresponding to the release of the communication restriction mode.

In response to detecting a release event of a communication restriction mode, a first electronic device may transmit a release command of the communication restriction mode to a second electronic device and release the communication restriction mode.

When the release event of the communication restriction mode is not detected, a first electronic device may release a communication restriction mode based on the release information of the communication restriction mode.

The first electronic device 400 may release the communication restriction mode based on a current location or a movement path. For example, the current location or movement path (for example, stepping off an airplane and then entering into an airport) of the first electronic device 400 can be checked through at least one activated communication function, and in response to checking the movement to a predetermined region, the communication restriction mode can be released through the release information.

In operation 503, in which release information of the communication restriction mode is configured, the processor 412 may also configure entry information of the communication restriction mode. The entry information of the communication restriction mode may include information related to the position in which the first electronic device 400 enters the communication restriction mode and the time at which the first electronic device 400 enters the communication restriction mode. For example, the processor 412 may check a source (starting point) based on the schedule information or input information, and may configure the checked source as the entry information of the communication restriction mode. As another example, the processor 412 may check a starting time based on the schedule information or input information, and may configure the checked starting time as the entry information of the communication restriction mode. In this case, the processor 412 may enter to the communication restriction mode based on the entry information of the communication restriction mode configured in operation 507.

Figure 6:
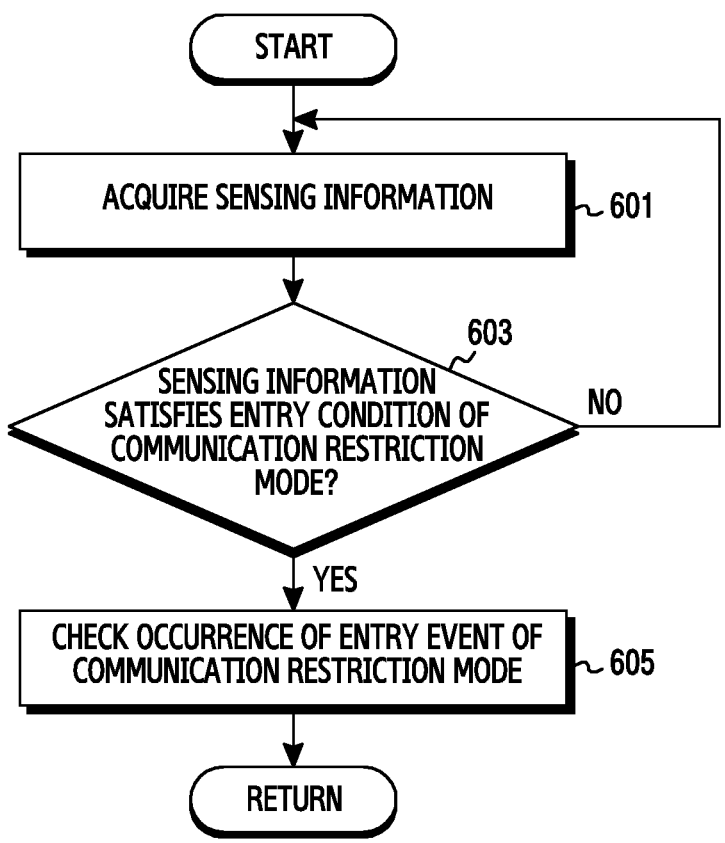
FIG. 6 is a flow diagram illustrating a method for identifying an entry event of a communication restriction mode by a first electronic device according to an embodiment of the present disclosure.

FIG. 6 is a flow diagram illustrating a method for identifying an entry event of a communication restriction mode by a first electronic device according to an embodiment of the present disclosure. For example, the method illustrated in FIG. 6 may be performed in operation 501 in FIG. 5.

Referring to FIG. 6, in operation 601, the processor 412 acquires sensing information through the sensor module 402. For example, the processor 412 may acquire at least one of sound, a motion, pressure, an altitude, and a touch input through the sensor module 402.

In operation 603, the processor 412 determines whether the acquired sensing information satisfies an entry condition for the communication restriction mode. For example, the processor 412 may determine whether a pre-defined instruction (for example, "enter to a communication restriction mode"), a pre-defined movement (e.g., flipping movement, rotation, etc. so as to expose the back), atmosphere pressure corresponding to a pre-defined range (or pressure change), an altitude corresponding to a pre-defined range (or a change in altitude), a touch input, etc. is acquired, which is configured as entry conditions for the communication restriction mode.

In operation 603, the processor 412 controls to re-perform operation 601 for acquiring the sensing information in response to the determination that the sensing information does not satisfy an entry condition for the communication restriction mode.

In operation 605, the processor 412 confirms that the entry event of the communication restriction mode has occurred in response to the determination (in operation 603) that the sensing information satisfies an entry condition for the communication restriction mode. In addition, the processor 412 may configure release information corresponding to the confirmation of the entry event occurrence of the communication restriction mode. For example, the processor 412 may perform an operation associated with the operation 503 of FIG. 5.

In FIG. 6, the processor 412 determines whether sensing information satisfies an entry condition for the communication restriction mode based on the sensing information detected through the sensor module 402, in order to check the occurrence of an entry event for the communication restriction mode, however, the processor 412 may also determine whether input information satisfies an entry condition for the communication restriction mode based on the input information detected through the input module 406. For example, the processor 412 may detect a button input for executing the communication restriction mode through the input module 406 so as to determine the occurrence of the entry event of the communication restriction mode.

Figure 7:
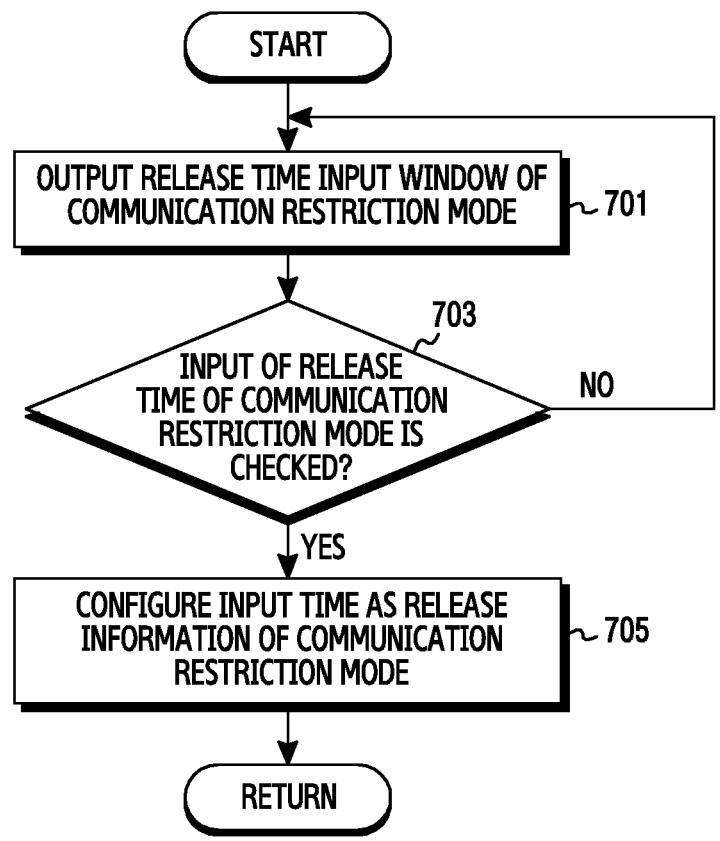
FIG. 7 is a flow diagram illustrating a method for configuring release information of a communication restriction mode by a user input in a first electronic device according to an embodiment of the present disclosure.

FIG. 7 is a flow diagram illustrating a method for configuring release information of a communication restriction mode by a user input in a first electronic device according to an embodiment of the present disclosure. For example, the method illustrated in FIG. 7 may be performed in operation 503 in FIG. 5.

Figure 8:
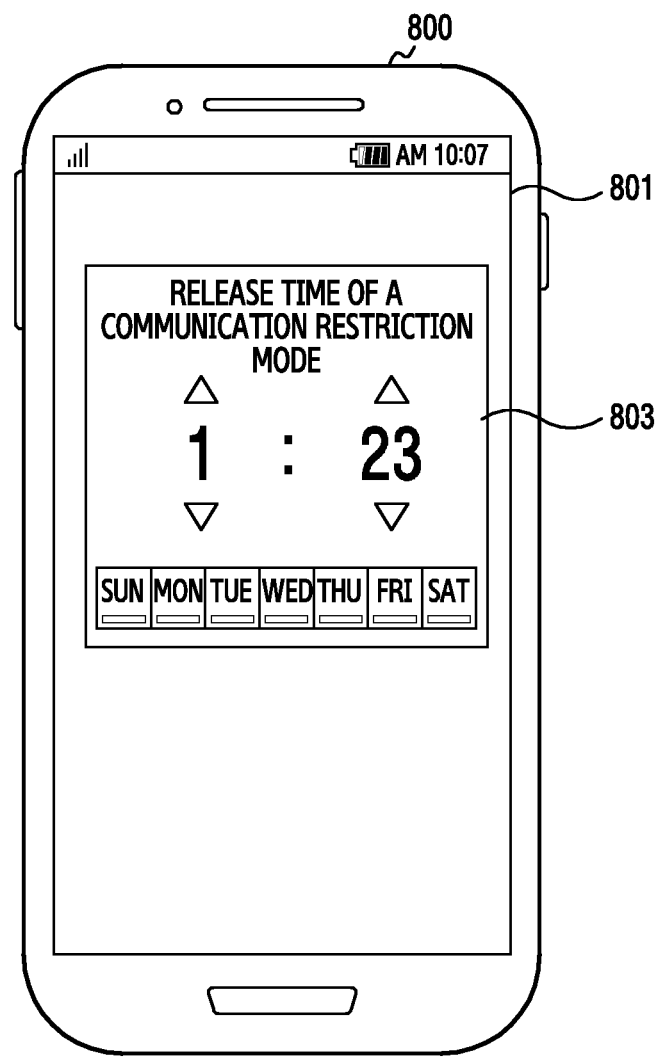
FIG. 8 illustrates a screen for inputting a release time of a communication restriction mode by a first electronic device according to an embodiment of the present disclosure.

FIG. 8 illustrates a screen for inputting a release time of a communication restriction mode by a first electronic device according to an embodiment of the present disclosure.

Referring to FIG. 7, in operation 701, in response to detecting the occurrence of an entry event of the communication restriction mode, the processor 412 outputs an input window for inputting a release time of the communication restriction mode. For example, the processor 412 may output an input window 803 which can configure information, such as the arrival day and arrival time, through a screen 801 of an electronic device 800 as illustrated in FIG. 8.

In operation 703, the processor 412 checks whether the release time of the communication restriction mode is input.

Here, the release time of the communication restriction mode may include a time at which the communication restriction mode is released or a remaining time until the communication restriction mode is released. For example, the processor 412 may check whether the release time of the communication restriction mode is input through the sensor module 402 or the input module 406 from the input window 803 for inputting the release time of the communication restriction mode.

In operation 705, in response to the input of the release time of the communication restriction mode, the processor 412 configures the input time to be the release information of the communication restriction mode. For example, in response to the time input through any one module of the sensor module 402 or the input module 406 in operation 703, the processor 412 may configure the input time to be the release time of the communication restriction mode.

When configuring the release information of the communication restriction mode in which some communication functions supported by the first the electronic device 400 are maintained in an activated state, the processor 412 may configure the location information input through the sensor module 402 or the input 406 as the release information of the communication restriction mode. For example, the processor 412 may configure the location of a particular airport input through the sensor module 402 or the input module 406 to be the release information of the communication restriction mode.

Figure 9:
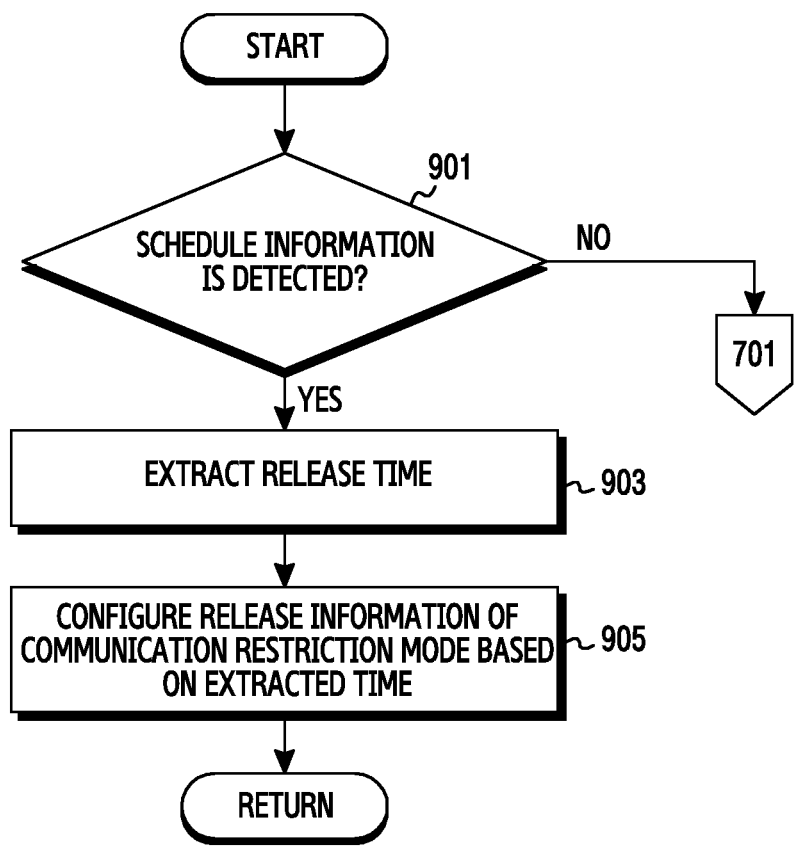
FIG. 9 is a flow diagram illustrating a method for configuring release information of a communication restriction mode by a first electronic device using schedule information according to an embodiment of the present disclosure.

FIG. 9 is a flow diagram illustrating a method for configuring release information of a communication restriction mode by a first electronic device using schedule information according to an embodiment of the present disclosure. For example, the method illustrated in FIG. 9 may be performed in operation 503 in FIG. 5.

Referring to FIG. 9, in operation 901, the processor 412 detects schedule information. For example, the processor 412 may detect schedule information stored in the memory 404, schedule information provided from the external electronic device or the server, etc. In addition, the schedule information may include information registered in a schedule function, ticket information, and information registered in a memo function.

When the schedule information is not detected in operation 901, the processor 412 may perform operation 701 of FIG. 7. For example, when the schedule information or ticket information is not detected from at least one of the memory 404, the server, and the external electronic device, the processor 412 may perform the operation 701 of FIG. 7, for outputting the input window 803 for inputting the release time of the communication restriction mode.

In operation 903, the processor 412 extracts the release time for releasing the communication restriction mode from the detected schedule information. For example, the processor 412 may extract the arrival time for releasing the communication restriction mode from the schedule information or ticket information detected from at least one of the memory 404, server, and external electronic device. The processor 412 may extract the arrival time by using a character recognition function.

In operation 905, the processor 412 configures the release information of the communication restriction mode based on the extracted time. For example, the processor 412 may configure the release time extracted from the operation 903 as the release time of the communication restriction mode.

When configuring the release information of the communication restriction mode in which some communication functions supported by the first the electronic device 400 are maintained in an activated state, the processor 412 may configure the location information extracted from the schedule information as the release information of the communication restriction mode. For example, the processor 412 may configure the destination extracted from the schedule information or the ticket information as the release information of the communication restriction mode.

Figure 10:
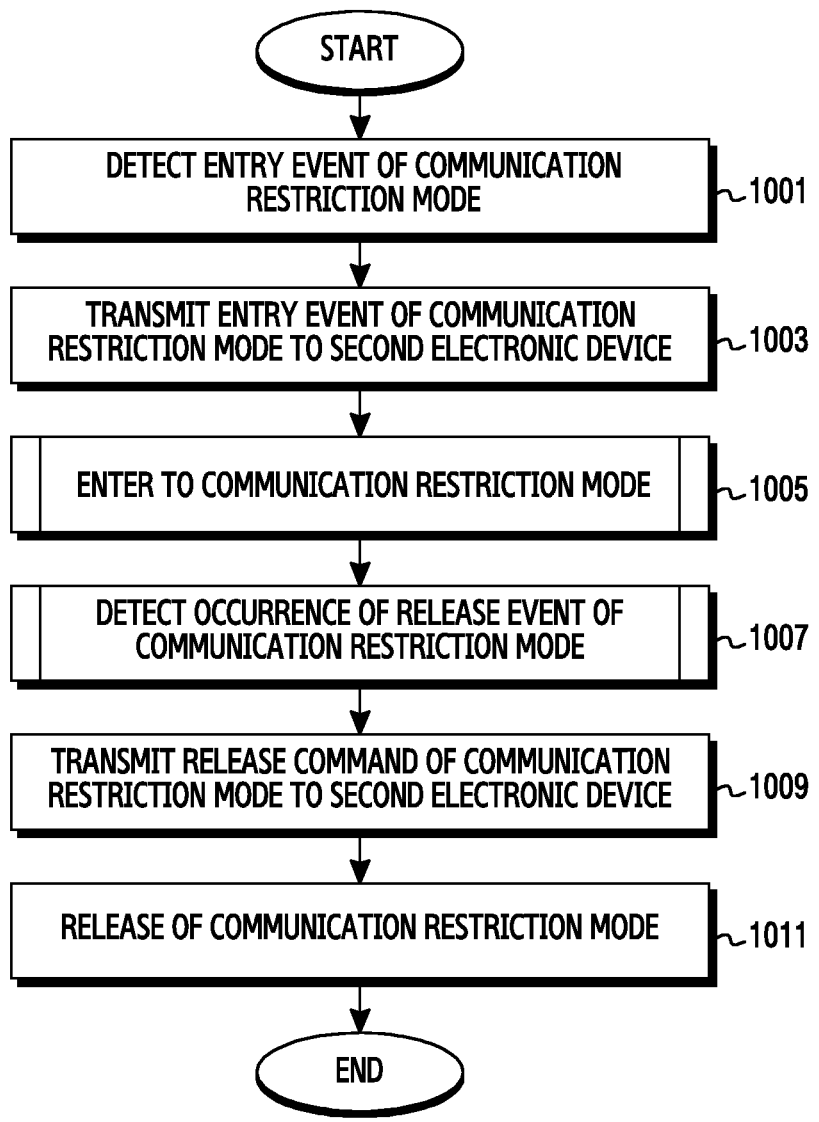
FIG. 10 is a flow diagram illustrating a method for controlling a communication restriction mode of a second electronic device by a first electronic device according to an embodiment of the present disclosure.

FIG. 10 is a flow diagram illustrating a method for controlling a communication restriction mode of a second electronic device by a first electronic device according to an embodiment of the present disclosure.

Referring to FIG. 10, in operation 1001, the processor 412 detects an occurrence of an entry event of the communication restriction mode. For example, the processor 412 may perform the operations of FIG. 6 to detect the entry event of the communication restriction mode. The communication restriction mode may be a mode for maintaining some communication functions of the communication functions supported by the first electronic device 400 in an activated state and maintaining other remaining communication functions in a deactivated state. Communication functions to be deactivated may be a function associated with the cellular communication function. In addition, communication functions to be activated may be a function associated with a short range communication function (for example, Bluetooth, Wi-Fi, ZigBee, Z-Wave, etc.), and the first electronic device 400 may maintain communication connection with a second electronic device (for example, a wearable device) by using an activated communication function.

In operation 1003, the processor 412 transmits the entry information of the communication restriction mode to the second electronic device. For example, in response to the occurrence of the entry event of the communication restriction mode, the processor 412 may transmit the entry information of the communication restriction mode to the second electronic device so as to maintain some communication functions of the communication functions of the second electronic device in an activated state.

In operation 1005, the processor 412 enters the communication restriction mode in response to transmitting the entry information of the communication restriction mode to the second electronic device. For example, in response to transmitting the entry information of the communication restriction mode to the second electronic device, the processor 412 may control so as to maintain a short range communication function of communication functions of the communication module 410 supported by the first electronic device 400 in an activated state and maintain other remaining communication functions in a deactivated state.

In operation 1007, the processor 412 detects whether the release event of the communication restriction mode has occurred. For example, the processor 412 may detect an occurrence of the release event of the communication restriction mode based on at least one piece of information among input information (for example, a button input), detected through the input module 406, for releasing the communication restriction mode, and sensing information (for example, sound, a motion, pressure, an altitude, and a touch input), detected through the sensor module 402, for releasing the communication restriction mode.

In operation 1009, in response to detecting the occurrence of a release event of the communication restriction mode, the processor 412 transmits a release command of the communication restriction mode to the second electronic device. For example, in response to detecting the occurrence of the release event of the communication restriction mode, the processor 412 may transmit a release command of the communication restriction mode for activating all the communication functions of the second electronic device to the second electronic device. The release command may be transmitted to the second electronic device, using a short range communication function maintaining the activated state.

In operation 1011, the processor 412 releases the communication restriction mode in response to transmitting the release command of the communication restriction mode to the second electronic device. For example, in response to transmitting to the second electronic device the release command of the communication restriction mode, the processor 412 may control all the communication functions of the communication module 410 to be activated. In addition, the second electronic device which has received the control command may release the communication restriction mode so as to activate the deactivated communication function.

The entry information of the communication restriction mode may be transmitted to the second electronic device after the first electronic device enters to the communication restriction mode. In addition, the release command of the communication restriction mode may also be transmitted to the second electronic device after the communication restriction mode is released.

In FIG. 10, the processor 412 determines whether an entry into the communication restriction mode or a release of the communication restriction mode has occurred based on the sensing information detected through the sensor module 402 and the input information detected through the input module 406, however, the processor 412 may also determine whether an entry into the communication restriction mode or a release of the communication restriction mode has occurred based on entry information of the communication restriction mode and release information of the communication restriction mode. For example, when boarding an airplane, the processor 412 may receive information that may be provided in real time from the airplane (for example, take-off notification information of an airplane, landing notification information of an airplane, the current position information of an airplane, etc.), and determine whether to enter the communication restriction mode or release the communication restriction mode by using the received information.

Figure 11:
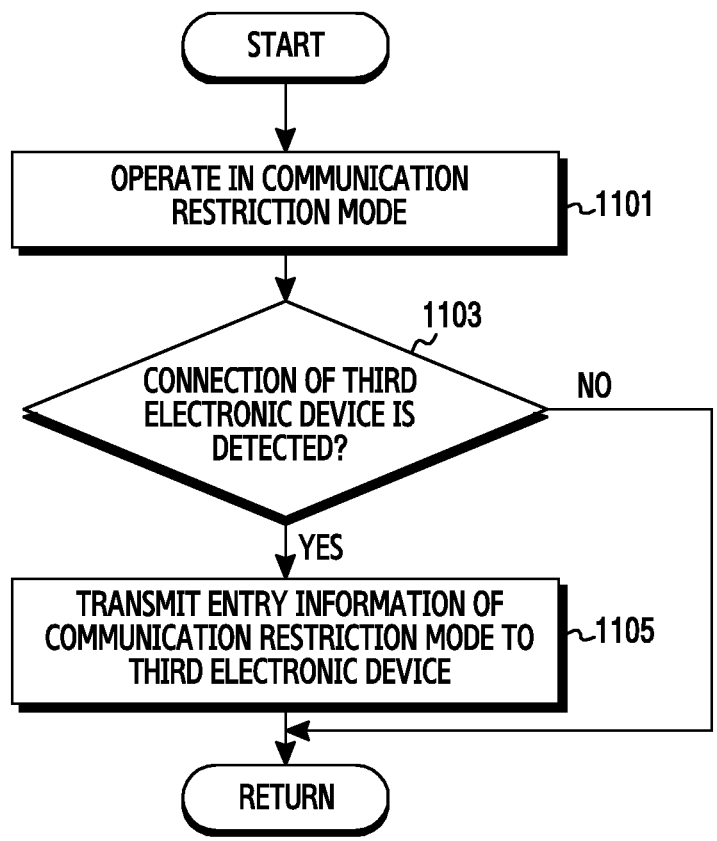
FIG. 11 is a flow diagram illustrating a method for transmitting, by a first electronic device, entry information of a communication restriction mode to a third electronic device according to an embodiment of the present disclosure.

FIG. 11 is a flow diagram illustrating a method for transmitting, by a first electronic device, entry information of a communication restriction mode to a third electronic device according to an embodiment of the present disclosure. For example, the method illustrated in FIG. 11 may be performed in operation 1005 in FIG. 10.

Referring to FIG. 11, in operation 1101, the processor 412 operates in the communication restriction mode in response to transmitting the entry information of the communication restriction mode to the second electronic device. For example, in response to transmitting to the second electronic device the entry information of the communication restriction mode, the processor 412 may control some communication functions (for example, a short range communication function) of the communication module 410 to be maintained in an activated state.

In operation 1103, the processor 412 detects whether a new third electronic device (for example, electronic device 400) is connected through one of the activated communication functions. For example, the processor 412 may detect whether the new third electronic device is paired through Bluetooth.

When the wireless communication connection to a new third electronic device has not been detected, the processor 412 performs an operation for detecting the occurrence of a release event of the communication restriction mode in operation 1007 of FIG. 10.

In operation 1105, in response to detecting that a new third electronic device is connected, the processor 412 transmits the entry information of the communication restriction mode to the third electronic device. For example, in response to the pairing of the new third electronic device through the Bluetooth, the processor 412 may control the entry information of the communication restriction mode to be transmitted to the third electronic device so as to operate the third electronic device in the communication restriction mode.

Figure 12:
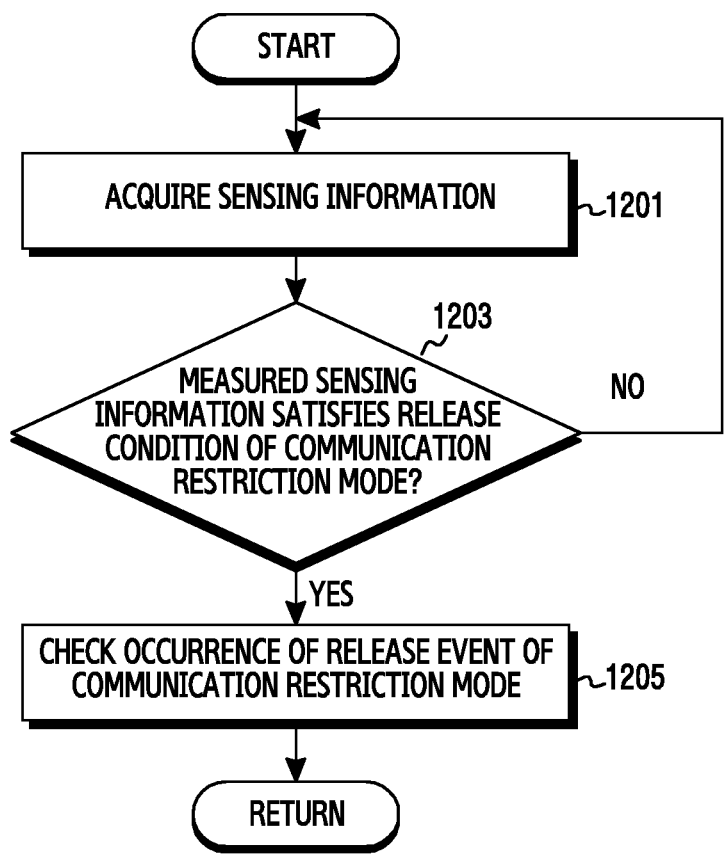
FIG. 12 is a flow diagram illustrating a method for releasing a communication restriction mode by a first electronic device according to an embodiment of the present disclosure.

FIG. 12 is a flow diagram illustrating a method for releasing a communication restriction mode by a first electronic device according to an embodiment of the present disclosure. For example, the method illustrated in FIG. 12 may be performed in operation 1007 of FIG. 10.

Referring to FIG. 12, in operation 1201, the processor 412 acquires sensing information through the sensor module 402. For example, the processor 412 may acquire at least one of sound, a motion, pressure, an altitude, and a touch input through the sensor module 402.

In operation 1203, the processor 412 determines whether the acquired sensing information satisfies a release condition for the communication restriction mode. For example, the processor 412 may determine whether a pre-defined instruction (for example, "release of a communication restriction mode"), a pre-defined movement (e.g., flipping movement, rotation, etc. so as to expose the back), atmosphere pressure corresponding to a pre-defined range (or pressure change), an altitude corresponding to a pre-defined range (or a change in altitude), a touch input, etc., is acquired, which is configured as a release condition for the communication restriction mode.

In operation 1205, the processor 412 confirms that the release event of the communication restriction mode has occurred, in response to the determination that the measured sensing information satisfies the release condition of the communication restriction mode.

In FIG. 12, the processor 412 determines whether sensing information satisfies the release condition of the communication restriction mode based on the sensing information detected by the sensor module 402, however, the processor 412 may also determine whether input information satisfies the release condition of the communication restriction mode based on the input information detected through the input module 406. For example, the processor 412 may detect a button input for releasing the communication restriction mode through the input module 406 so as to determine the occurrence of the release event of the communication restriction mode.

Figure 13:
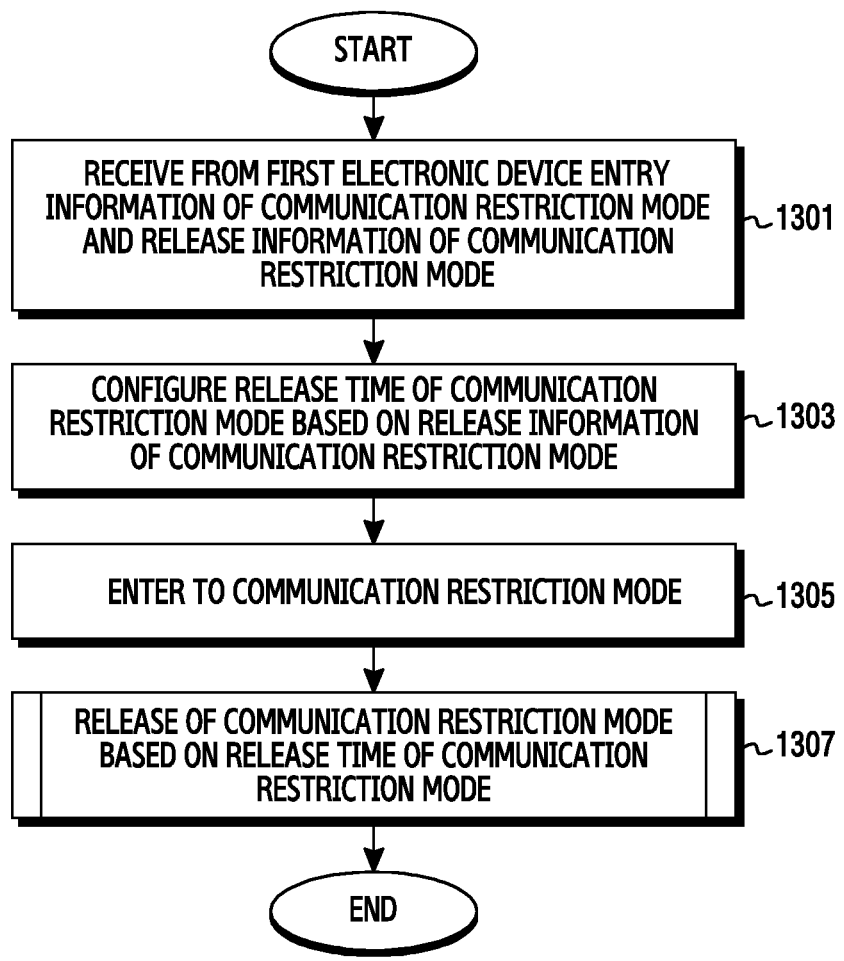
FIG. 13 is a flow diagram illustrating a method for controlling, by a second electronic device, a communication restriction mode on the basis of information received from a first electronic device according to an embodiment of the present disclosure.

FIG. 13 is a flow diagram illustrating a method for controlling, by a second electronic device, a communication restriction mode on the basis of information received from a first electronic device according to an embodiment of the present disclosure.

Referring to FIG. 13, in operation 1301, the processor 412 receives the entry information of the communication restriction mode and the release information of the communication restriction mode from the first electronic device (for example, a portable terminal) connected thereto. The communication restriction mode may include a mode for maintaining some of the communication functions supported by the second electronic device 400 in an activated state and maintaining other remaining communication functions in a deactivated state. Communication functions to be deactivated may be a function associated with a short range communication function (for example, Bluetooth, Wi-Fi, ZigBee, Z-Wave, etc.), and the first electronic device 400 may maintain communication connection with a second electronic device (for example, a wearable device) through an activated communication function.

In operation 1303, the processor 412 configures the release time of the communication restriction mode based on the received release information of the communication restriction mode. For example, the processor 412 may configure the received release time of the communication restriction mode as the release time of the communication restriction mode. In addition, the processor 412 may create a timer operating until the release time of the communication restriction mode.

In operation 1305, in response to the configuration of the release time of the communication restriction mode, the processor 412 controls the electronic device to enter to the communication restriction mode. For example, in response to the configuration of the release time of the communication restriction mode, the processor 412 may control all the communication functions of the communication module 410 to be maintained in a deactivated state.

In operation 1307, in response to entering to the communication restriction mode, the processor 412 may release the communication restriction mode based on the release time of the communication restriction mode. For example, in response to entering to the communication restriction mode, the processor 412 may control all the communication functions of the communication module 410 to be in an activated state at the release time of the communication restriction mode, which is configured in the operation 1303.

When configuring the release information of the communication restriction mode in which some of the communication functions supported by the second electronic device 400 are maintained in an activation state, the processor 412 may configure a release location of the communication restriction mode based on the release information of the communication restriction mode. For example, when receiving, from the first electronic device, location information configured to release the communication restriction mode, the processor 412 may check the location information of the second electronic device 400 through the activated communication function so as to release the communication restriction mode at a predetermined position.

The processor 412 may control the electronic device to enter to the communication restriction mode based on the entry information received from the first electronic device in operation 1305. For example, the processor 412 may control the electronic device to enter to a communication restriction mode at a time point that satisfies the location information or time information related to the entry into the communication restriction mode, which is received from the first electronic device.

Figure 14:
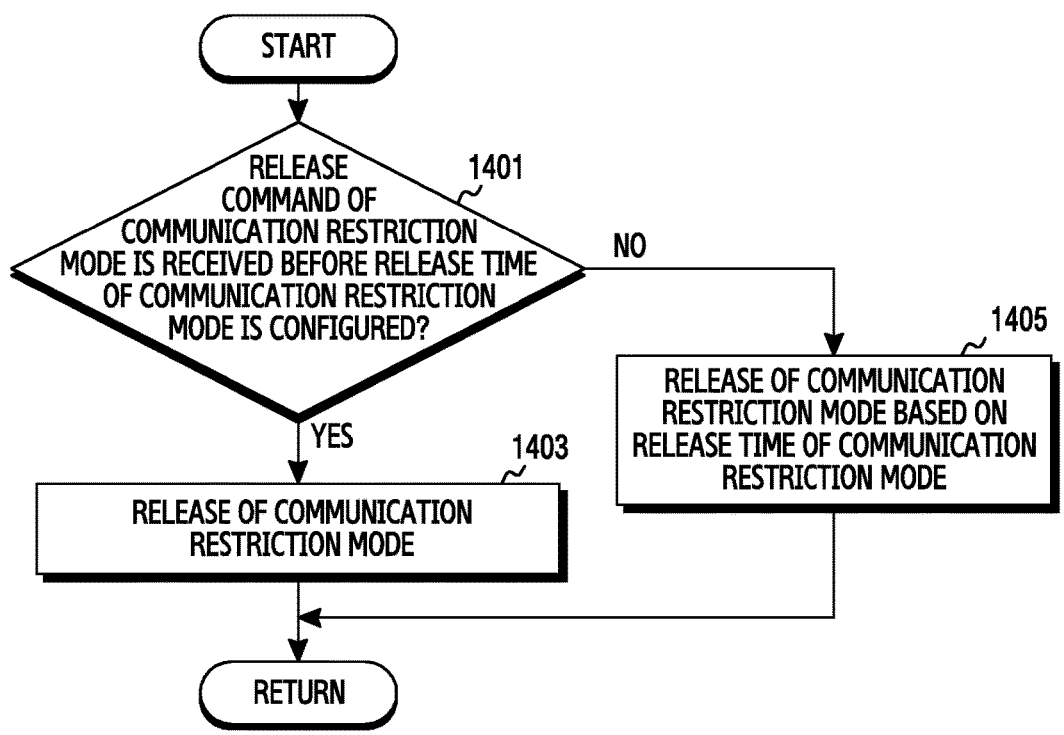
FIG. 14 is a flow diagram illustrating a method for releasing a communication restriction mode by a second electronic device according to an embodiment of the present disclosure.

FIG. 14 is a flow diagram illustrating a method for releasing a communication restriction mode by a second electronic device according to an embodiment of the present disclosure. For example, the method illustrated in FIG. 14 may be performed in operation 1307 of FIG. 13, where the second electronic device and the first electronic device are connected to each other through some of the activated communication functions.

Referring to FIG. 14, in operation 1401, the processor 412 determines whether the release command of the communication restriction mode is received prior to the configured release time of the communication restriction mode. The communication restriction mode may include a mode for maintaining some of the communication functions (for example, short range communication function) in an activated state. For example, the second electronic device may be paired with the first electronic device through Bluetooth while operating in the communication restriction mode.

In operation 1403, the processor 412 releases the communication restriction mode in response to receiving the release command of the communication restriction mode prior to the configured release time of the communication restriction mode.

In operation 1405, the processor 412 releases the communication restriction mode based on the release time of the communication restriction mode, in response to not receiving the release command of the communication restriction mode prior to the configured release time of the communication restriction mode. For example, the processor 412 may operate in the communication restriction mode until the configured timer expires, and release the communication restriction mode when the timer has expired.

Even if located in places other than the configured release position of the communication restriction mode, the processor 412 may release the communication restriction mode when receiving the release command of the communication restriction mode from the first electronic device.

Figure 15:
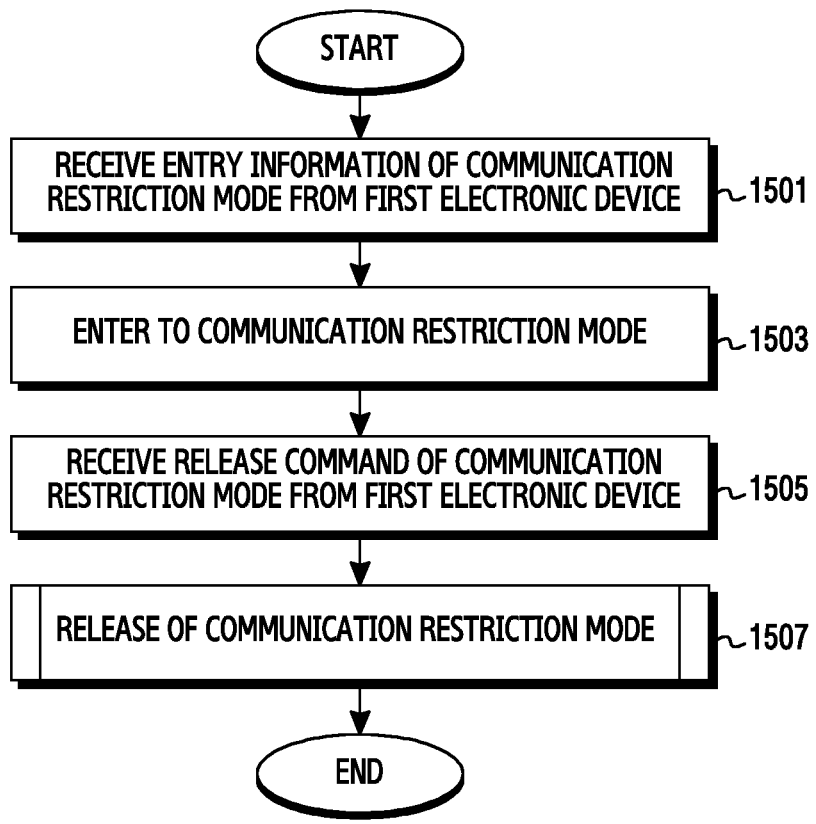
FIG. 15 is a flow diagram illustrating a method for controlling, by a second electronic device, a communication restriction mode on the basis of information received from a first electronic device according to an embodiment of the present disclosure.

FIG. 15 is a flow diagram illustrating a method for controlling, by a second electronic device, a communication restriction mode on the basis of information received from a first electronic device according to an embodiment of the present disclosure.

Referring to FIG. 15, in operation 1501, the processor 412 receives the entry information of the communication restriction mode from the first electronic device (for example, a portable terminal). The communication restriction mode may include a mode for maintaining some of the communication functions (for example, a short range communication function) supported by the second electronic device 400 in an activated state. For example, the processor 412 may receive, from the first electronic device, entry information of the communication restriction mode for maintaining some of the communication functions (for example, a short range communication function) of the communication module 410 in an activated state.

In operation 1503, the processor 412 enters the communication restriction mode in response to receiving the entry information of the communication restriction mode from the first electronic device. For example, in response to receiving the entry information of the communication restriction mode from the first electronic device, the processor 412 may control some of the communication functions of the communication module 410 to be maintained in an activated state.

In operation 1505, the processor 412 receives the release command of the communication restriction mode from the first electronic device, while operating in the communication restriction mode. For example, the processor 412 may receive, from the first electronic device, the release command of the communication restriction mode which maintains all the communication functions in an activated state through the communication module 410.

In operation 1507, the processor 412 releases the communication restriction mode in response to receiving the release command of the communication restriction mode from the first electronic device. For example, in response to receiving the release command of the communication restriction mode, the processor 412 may control all the communication functions of the communication module 410 to be maintained in an activated state.

In FIG. 15, the processor 412 enters into the communication restriction mode and releases the communication restriction mode according to the entry information of the communication restriction mode and the release command of the communication restriction mode, received from the first electronic device, however, the processor 412 may also enter to the communication restriction mode and release the communication restriction mode based on the entry information of the communication restriction mode and the release information of the communication restriction mode, transmitted from the external electronic device. For example, when boarding an airplane, the processor 412 may receive information that may be provided in real time from the airplane (for example, take-off notification information of an airplane, landing notification information of an airplane, the current position information of an airplane, etc.), and determine whether to enter the communication restriction mode or release the communication restriction mode by using the received information.

Figure 16:
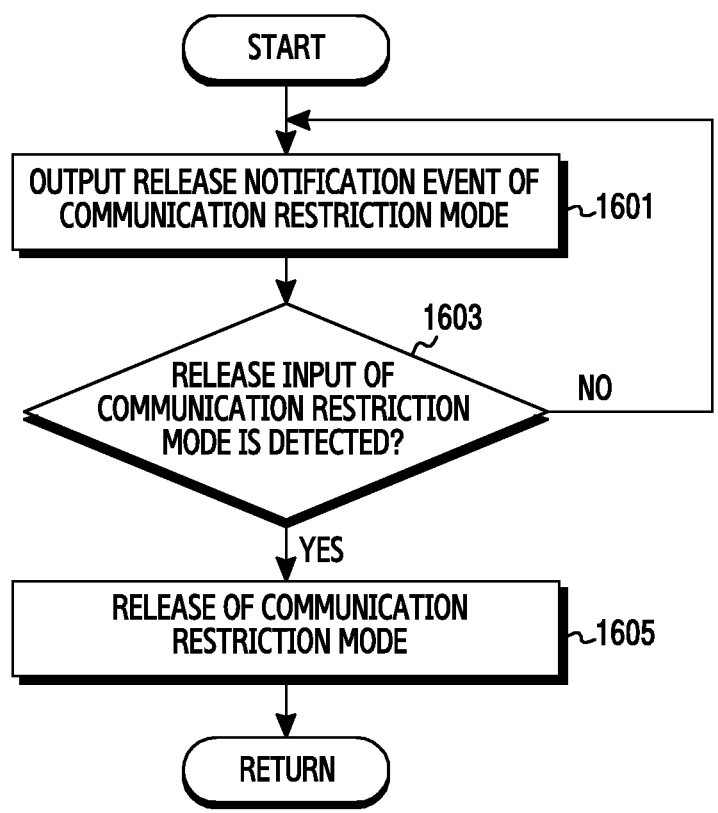
FIG. 16 is a flow diagram illustrating a method for releasing a communication restriction mode by a second electronic device according to an embodiment of the present disclosure.

FIG. 16 is a flow diagram illustrating a method for releasing a communication restriction mode by a second electronic device according to an embodiment of the present disclosure. For example, the method illustrated in FIG. 16 may be performed in operation 1507 in FIG. 15.

Figure 17:
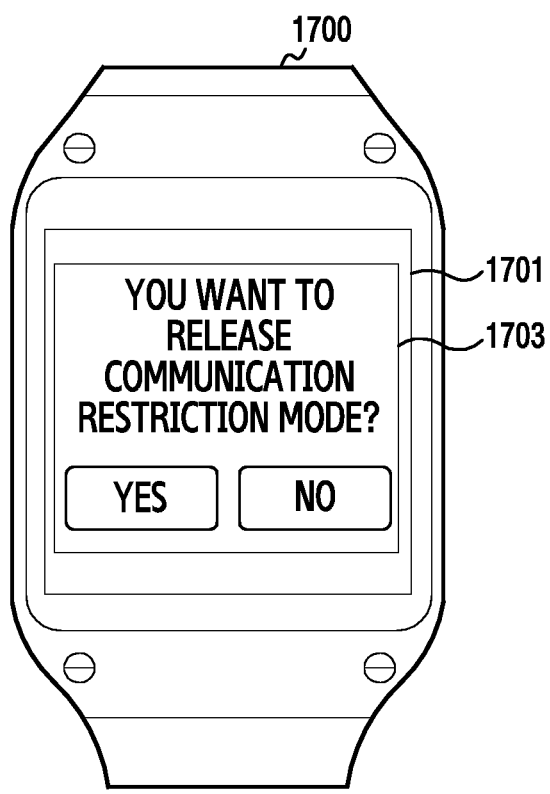
FIG. 17 illustrates an output screen for a release notification event of a communication restriction mode by a second electronic device according to an embodiment of the present disclosure.

FIG. 17 illustrates an output screen for a release notification event of a communication restriction mode by a second electronic device according to an embodiment of the present disclosure.

Referring to FIG. 16, in operation 1601, the processor 412 outputs a release notification event of the communication restriction mode in response to receiving the release command of the communication restriction mode from the first electronic device. For example, the processor 412 may output release notification event information 1703 of the communication restriction mode through a screen 1701 of an electronic device 1700, as illustrated in FIG. 17.

In operation 1603, the processor 412 determines whether an input for releasing the communication restriction mode is detected, in response to the output of the release notification event information of the communication restriction mode. For example, the processor 412 may detect, from the release notification event information 1703 of the communication restriction mode, which is output through the screen 1701 of FIG. 17, a touch input, a voice command, a predetermined movement, a button input and the like for selecting a "Yes" button so as to determine an input for releasing the communication restriction mode.

In operation 1605, the processor 412 releases the communication restriction mode in response to detecting the release input of the communication restriction mode. For example, in response to detecting the input for releasing the communication restriction mode, the processor 412 may control all the communication functions of the communication module 410 to be maintained in an activated state.

Figure 18:
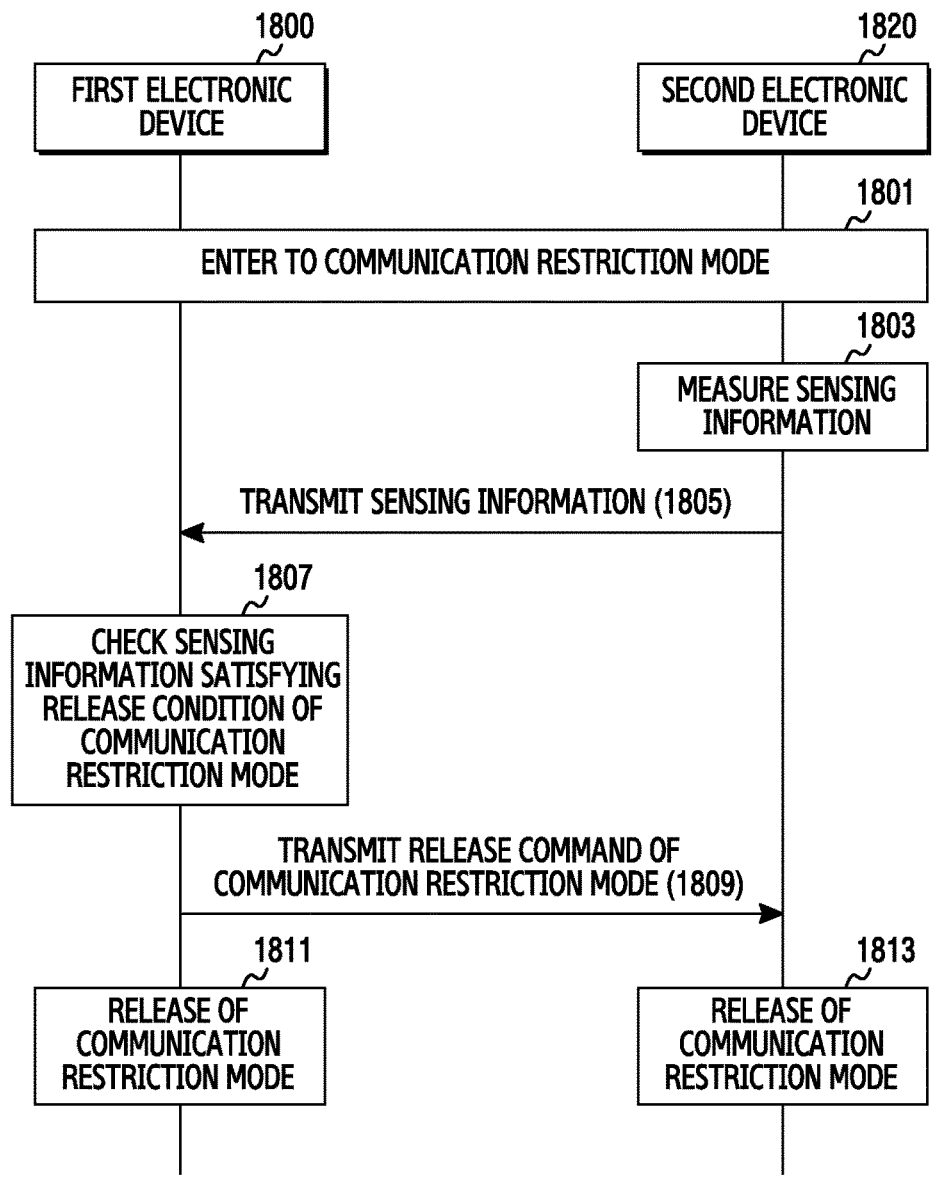
FIG. 18 is a signal flow diagram illustrating a method for releasing, by a second electronic device, communication restriction modes of a first electronic device and the second electronic device based on sensing information detected by the second electronic device, according to an embodiment of the present disclosure.

FIG. 18 is a signal flow diagram illustrating a method for releasing, by a second electronic device, communication restriction modes of a first electronic device and the second electronic device based on sensing information detected by the second electronic device, according to an embodiment of the present disclosure.

Referring to FIG. 18, in operation 1801, a first electronic device 1800 and a second electronic device 1820 enter a communication restriction mode. For example, the first electronic device (for example, a portable terminal) 1800 may enter to the communication restriction mode through the method of FIG. 5 or FIG. 10, and the second electronic device (for example, a wearable device) 1820 may enter to the communication restriction mode through the method of FIG. 13 or FIG. 15. The communication restriction mode may include a mode for maintaining some of the communication functions (for example, short range communication function) in an activated state.

In operation 1803, the second electronic device 1820 measures sensing information. For example, the second electronic device 1820 may measure at least one piece of information of sound, a motion, pressure, an altitude, and a touch input. In operation 1805, the second electronic device 1820 transmits the measured sensing information to the first electronic device 1800. The first electronic device 1800 and the second electronic device 1820 are connected to each other through a communication function for maintaining an activated state.

In operation 1807, the first electronic device 1800 identifies sensing information that satisfies the release condition of the communication restriction mode based on the transmitted sensing information. Here, an operation of identifying the sensing information satisfying the release condition of the communication restriction mode may include the method of FIG. 12.

In operation 1809, the first electronic device 1800 transmits the release command of the communication restriction mode to the second electronic device 1820 in response to identifying the sensing information satisfying the release condition of the communication restriction mode. For example, the first electronic device 1800 may transmit the release command of the communication restriction mode so as to maintain all the communication functions of the second electronic device 1820 in an activated state, in response to identifying the sensing information satisfying the release condition of the communication restriction mode.

In operation 1811, the first electronic device 1800 releases the communication restriction mode in response to transmitting the release command of the communication restriction mode to the second electronic device 1820. For example, the first electronic device 1800 may activate all the communication functions in response to transmitting the release command of the communication restriction mode to the second electronic device 1820.

In operation 1813, the first electronic device 1800 releases the communication restriction mode in response to receiving the release command of the communication restriction mode from the first electronic device 1800. For example, the second electronic device 1820 may activate all the communication functions in response to receiving the release information of the communication restriction mode from the first electronic device 1800.

In operation 1803, the second electronic device 1820 identifies sensing information satisfying the release condition of the communication restriction mode, and in operation 1807, the first electronic device 1800 identifies sensing information satisfying the release condition of the communication restriction mode, wherein both operations may be performed by the second electronic device 1820, and the release command of the communication restriction mode may be transmitted to the first electronic device 1800.

In accordance with an aspect of the present disclosure, a method and electronic device for controlling an external electronic device provides, for example, when the electronic device enters into a communication restriction mode, entry information of the communication restriction mode to an external electronic device so that the external electronic device may also easily enter to the communication restriction mode. Accordingly, the other electronic device may not be affected by a communication function.

In addition, when the electronic device enters a communication restriction mode, the electronic device and external electronic device which have entered the communication restriction mode can provide release information of the communication restriction mode to the external electronic devices so as to simultaneously release the communication restriction mode.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A first electronic device comprising:
a communication module configured to communicate with a second electronic device; and
a processor configured to:
in response to an entry event for switching a mode of the first electronic device into a communication restriction mode, set release information for releasing the communication restriction mode, wherein at least one communication function of the first electronic device is deactivated in the communication restriction mode,
transmit, to the second electronic device, entry information of the communication restriction mode and the release information of the communication restriction mode,
wherein the entry information includes information for switching a mode of the second electronic device into the communication restriction mode, in which at least one communication function of the second electronic device is deactivated, and
after transmitting the entry information and the release information to the second electronic device, control, based on the entry event, the first electronic device to enter into the communication restriction mode.

2. The first electronic device of claim 1, wherein the entry information and the release information further include at least one of location information and time information associated with an entry into the communication restriction mode and a release of the communication restriction mode.

3. The first electronic device of claim 1, wherein the processor is further configured to:
detect a predefined release condition for releasing the communication restriction mode, in response to detecting the predefined release condition, transmit a release command to the second electronic device by using at least one activated communication function, and
after transmitting the release command to the second electronic device, release the communication restriction mode.

4. The first electronic device of claim 1, wherein the processor is further configured to detect the entry event based on at least one of sensor information acquired through a sensor of the first electronic device, a button input, and notification information transmitted from an external electronic device.

5. The first electronic device of claim 1, wherein the processor is further configured to set the entry information and the release information based on schedule information that is stored in advance or received from an external electronic device, and
wherein the schedule information comprises at least one of memo information and ticket information.

6. The first electronic device of claim 1, wherein the processor is further configured to set the entry information and the release information based on an input with respect to a configuration screen of the communication restriction mode.

7. A second electronic device comprising:
a communication module configured to communicate with a first electronic device; and
a processor configured to:
receive, from the first electronic device, entry information of the communication restriction mode and release information of the communication restriction mode, and
in response to receiving the entry information and the release information, control the second electronic device to enter the communication restriction mode, wherein at least one communication function of the second electronic device is deactivated in the communication restriction mode,
wherein the received release information is set at the first electronic device in response to an entry event of the communication restriction mode,
wherein the entry event for switching a mode of the first electronic device into the communication restriction mode occurs at the first electronic device, and
wherein the first electronic device enters the communication restriction mode after transmitting, by the first electronic device, the entry information and the release information to the second electronic device.

8. The second electronic device of claim 7, wherein the processor is further configured to, in response to receiving a release command from the first electronic device while performing the communication restriction mode, release the communication restriction mode.

9. The second electronic device of claim 7, wherein the processor is further configured to:
detect a predefined release condition while performing the communication restriction mode, and
provide the predefined release condition to the first electronic device.

10. The second electronic device of claim 7, wherein the entry information of the communication restriction mode and the release information of the communication restriction mode comprise at least one of location information and time information associated with an entry into the communication restriction mode and a release of the communication restriction mode, and
wherein the processor is further configured to, in response to receiving time information associated with an entry into and release of a communication restriction mode in which all communication functions are deactivated, control the entry into and the release of the communication restriction mode based on the time information.

11. The second electronic device of claim 10, wherein the processor is further configured to, in response to receiving the location information and the time information associated with an entry into and a release of the communication restriction mode, control the entry into and the release of the communication restriction mode based on at least one of the location information and time information.

12. A method for operating a first electronic device, the method comprising:
in response to identifying an entry event for switching a mode of the first electronic device into a communication restriction mode, setting release information for releasing the communication restriction mode, wherein at least one communication function of the first electronic device is deactivated in the communication restriction mode;

transmitting, to a second electronic device, entry information of the communication restriction mode and the release information of the communication restriction mode such that at least one communication function of the second electronic device is deactivated, wherein the entry information includes information for switching a mode of the second electronic device into the communication restriction mode in which at least one communication function of the second electronic device is deactivated; and after transmitting the entry information and the release information to the second electronic device, control, based on the entry event, the first electronic device to enter into the communication restriction mode.

13. The method of claim 12, wherein the entry information and the release information comprise at least one of location information and time information associated with an entry into the communication restriction mode and a release of the communication restriction mode.

14. The method of claim 12, further comprising:
detecting a predefined release condition for releasing the communication restriction mode,
in response to detecting the predefined release condition, transmitting a release command to the second electronic device by using at least one activated communication function; and
after transmitting the release command to the second electronic device, releasing the communication restriction mode.

15. The method of claim 12, wherein the entry event occurs based on at least one of sensor information, a button input, and notification information transmitted from an external electronic device.

16. The method of claim 12, wherein the entry information and the release information are set based on schedule information which is stored in advance or received from an external electronic device, and
wherein the schedule information comprises at least one of memo information and ticket information.

17. The method of claim 12, wherein the entry information and the release information are set based on an input with respect to a configuration screen of the communication restriction mode.

* * * * *